(12) United States Patent
Komatsu et al.

(10) Patent No.: US 8,253,367 B2
(45) Date of Patent: Aug. 28, 2012

(54) CONTROL APPARATUS, CONTROL METHOD, AND CONTROL PROGRAM FOR ELASTIC ACTUATOR DRIVE MECHANISM

(75) Inventors: Mayumi Komatsu, Kyoto (JP); Yasunao Okazaki, Shiga (JP)

(73) Assignee: Panasonic Corporation, Osaka (JP)

(*) Notice: Subject to any disclaimer, the term of this patent is extended or adjusted under 35 U.S.C. 154(b) by 0 days.

(21) Appl. No.: 13/366,638

(22) Filed: Feb. 6, 2012

(65) Prior Publication Data
US 2012/0133318 A1 May 31, 2012

Related U.S. Application Data

(63) Continuation of application No. PCT/JP2010/007283, filed on Dec. 15, 2010.

(30) Foreign Application Priority Data

Jan. 15, 2010 (JP) .................................. 2010-006390

(51) Int. Cl.
G05B 11/01 (2006.01)

(52) U.S. Cl. ..................... 318/560; 318/561; 318/568.22

(58) Field of Classification Search .................. 318/560, 318/561, 568.22; 360/78.04, 78.09
See application file for complete search history.

(56) References Cited

U.S. PATENT DOCUMENTS

| 5,369,346 | A | 11/1994 | Takahashi et al. | |
|---|---|---|---|---|
| 6,097,564 | A | * | 8/2000 | Hunter ........................ 360/78.04 |
| 2006/0207419 | A1 | 9/2006 | Okazaki et al. | |
| 2007/0118249 | A1 | 5/2007 | Nagamatsu | |
| 2009/0324366 | A1 | 12/2009 | Okazaki | |

FOREIGN PATENT DOCUMENTS

| JP | 62-212710 | 9/1987 |
|---|---|---|
| JP | 2-204805 | 8/1990 |
| JP | 3-60991 | 3/1991 |
| JP | 3-256681 | 11/1991 |
| JP | 5-55279 | 8/1993 |
| JP | 5-318341 | 12/1993 |
| JP | 6-344283 | 12/1994 |
| JP | 8-1819 | 1/1996 |
| JP | 8-197484 | 8/1996 |
| JP | 11-235691 | 8/1999 |
| JP | 11-247807 | 9/1999 |
| JP | 2005-95989 | 4/2005 |
| JP | 2007-7799 | 1/2007 |
| JP | 2007-144524 | 6/2007 |
| JP | 2008-121783 | 5/2008 |
| WO | 2008/090753 | 7/2008 |

OTHER PUBLICATIONS

International Search Report issued Feb. 8, 2011 in International (PCT) Application No. PCT/JP2010/007283.
Japanese Office Action (Notification of Reasons for Refusal) issued Apr. 3, 2012 in counterpart Japanese Patent Application No. 2011-549768.

* cited by examiner

*Primary Examiner* — Karen Masih
(74) *Attorney, Agent, or Firm* — Wenderoth, Lind & Ponack, L.L.P.

(57) ABSTRACT

An abnormality determination unit that determines whether or not an output measurement unit is abnormal is provided, and whether or not the output measurement unit is abnormal is determined. When the output measurement unit is abnormal, an elastic actuator is controlled based on a desired internal state decision unit and an internal state error compensation unit. Accordingly, it becomes possible to control the elastic actuator to continuously operate to a predetermined position without instantaneously stopping even when the output measurement unit is abnormal.

20 Claims, 22 Drawing Sheets

US 8,253,367 B2

CONTROL APPARATUS, CONTROL METHOD, AND CONTROL PROGRAM FOR ELASTIC ACTUATOR DRIVE MECHANISM

This is a continuation application of International Application No. PCT/JP2010/007283, filed Dec. 15, 2010.

BACKGROUND OF THE INVENTION

The present invention relates to a control apparatus, a control method, and a control program for an elastic actuator drive mechanism, which serve for controlling operations of a drive mechanism that drives by an elastic actuator such as a fluid pressure drive actuator driven by deformation of an elastic body.

In recent years, since cell production factories have become widespread, and so on, development of robots that cooperate with person has been performed energetically. Unlike conventional robots that operate in work areas for robots and separated from areas where a person is present, it is necessary for such a robot that cooperates with the person to co-exist with the person. Accordingly, the robot that cooperates with the person is different in required specifications from a conventional industrial robot and the like.

First, in the conventional industrial robot, an electric motor or a decelerator is used, and by high-gain feedback control, hand position accuracy as high as 0.1 mm of repetition accuracy is realized. However, in many cases, a mechanism driven by such an electric motor has high rigidity and is poor in flexibility, and is problematic in terms of safety.

As opposed to this, in the robot that cooperates with person, such safety is regarded as important that the robot cannot harm humans at the time of contacting the humans. Hence, it cannot be said that the mechanism driven by the electric motor, as in the conventional industrial robot, is suitable for the field of domestic robots where the safety is regarded important, and a flexible and safe robot arm is required.

Regarding these issues, for example, there is proposed a robot arm that uses a McKibben-type pneumatic actuator. The McKibben-type pneumatic actuator has a structure, in which a constraining means formed of fiber cords is arranged on an outer surface of a tubular elastic body made of a rubber material, and both end portions of the tubular elastic body are hermetically sealed by sealing members. When an internal pressure is given through a fluid injection/ejection means to an inner space of the tubular elastic body by a compressive fluid such as air, the tubular elastic body attempts to expand mainly in a radius direction. However, by a function of the constraining means, a motion to expand in the radius direction is converted into a motion in a central axial direction of the tubular elastic body, and then, an overall length of the tubular elastic body contracts. This McKibben-type actuator is mainly formed of the elastic body, and accordingly, is provided with flexibility, and has such features in being a safe and lightweight actuator.

Secondly, since the conventional industrial robot operates in a space separated from a person, it is considered the safest for the conventional industrial robot to instantaneously stop its operation, for example, when a sensor failure and the like occur.

As opposed to this, in the case of the robot that moves in the same space with the person, it is not always the safest for the robot to instantaneously stop the operation when the sensor failure and the like occur. For example, when the robot operates cooperatively with the person, in the case where the robot suddenly stops, the person who operates cooperatively with the robot cannot stop quickly, and is considered to fall in a dangerous state. However, when the sensor has failed, information necessary for the operation control cannot be gained, and there has been an issue that it is difficult to continue the operation.

For such a sensor failure as described above, a conventional technique discloses a control apparatus that controls the robot by reading previously instructed and stored data in place of a sensor signal (Japanese Examined Utility Model Publication No. H08-1819). Moreover, in a robot including a distance sensor and a plurality of movement mechanism position detectors, a conventional technique discloses a movement control apparatus including a computing unit that obtains the same alternative signal as a correct movement mechanism position signal, which is to be originally outputted by a broken movement mechanism position detector, based on a sensor signal from the distance sensor and movement mechanism position signals from normal movement mechanism position detectors (Japanese Examined Patent Publication No. H05-55279).

However, although the instructed data that serves as an alternative to the sensor signal becomes necessary in advance in the technique of Japanese Examined Utility Model Publication No. H08-1819, there has been an issue that it is difficult to assume every operation of the robot in advance, and it is difficult to prepare the instructed data. Moreover, in the technique of Japanese Examined Patent Publication No. H05-55279, there has been an issue that a correct alternative signal cannot be computed in a robot that does not have the distance sensor.

SUMMARY OF THE INVENTION

It is an object of the present invention to provide a control apparatus, a control method, and a control program for an elastic actuator drive mechanism, which are capable of resolving the above conventional issues, and are capable of continuing operation of a drive mechanism of a robot arm or the like driven by an elastic actuator without instantaneously stopping the operation even at the time of a sensor abnormality, and without preparing the instructed data in advance or including the sensor capable of computing the alternative signal.

In order to achieve the above object, the present invention is structured as follows.

According to one aspect of the present invention, there is provided a control apparatus for an elastic actuator drive mechanism, comprising;

a desired value output unit that outputs a desired value of an output of an elastic actuator;

an output error compensation unit that compensates an output error by receiving the desired value of the output of the elastic actuator and a measurement value of the output of the elastic actuator, the measurement value being measured by an output measurement unit;

a desired internal state decision unit that decides a desired value of the internal state of the elastic actuator with respect to a measurement value of the internal state, based on a relationship between the output and the internal state of the elastic actuator, with reference to the desired value of the output of the elastic actuator, the measurement value being measured by an internal state measurement unit;

an internal state error compensation unit that compensates an internal state error based on an output from the output error compensation unit and an output from the internal state measurement unit; and an abnormality determination unit that determines whether or not the output measurement unit is abnormal based on the measurement value of the output of the elastic actuator measured by the output measurement unit, the measurement value of the internal state of the elastic actuator measured by the internal state measurement unit, and the desired value of the output of the elastic actuator, wherein when the abnormality determination unit determines that the output measurement unit is abnormal, an operation of the output error compensation unit is stopped, and control is performed so that the elastic actuator continues to operate based on an output desired value as the output of the desired value output unit by the desired internal state decision unit and the internal state error compensation unit.

With such a configuration, the control for the elastic actuator drive mechanism, which enables the continuous operation of the elastic actuator even when the output measurement unit has failed or is abnormal, can be realized.

According to another aspect of the present invention, there is provided a control method for an elastic actuator drive mechanism, comprising:

outputting, by a desired value output unit, a desired value of an output of an elastic actuator;

compensating, by an output error compensation unit, an output error by receiving the desired value of the output of the elastic actuator and a measurement value of the output of the elastic actuator, the measurement value being measured by an output measurement unit;

deciding, by a desired internal state decision unit, a desired value of the internal state of the elastic actuator with respect to a measurement value of the internal state measured by an internal state measurement unit, based on a relationship between the output and the internal state of the elastic actuator, with reference to the desired value of the output of the elastic actuator;

compensating, by an internal state error compensation unit, an internal state error based on an output from the output error compensation unit and an output from the internal state measurement unit; and determining, by an abnormality determination unit, whether or not the output measurement unit is abnormal based on the measurement value of the output of the elastic actuator measured by the output measurement unit, the measurement value of the internal state of the elastic actuator measured by the internal state measurement unit, and the desired value of the output of the elastic actuator, wherein when the abnormality determination unit determines that the output measurement unit is abnormal, an operation of the output error compensation unit is stopped, and control is performed so that the elastic actuator continues to operate based on an output desired value as the output of the desired value output unit by the desired internal state decision unit and the internal state error compensation unit.

According to another aspect of the present invention, there is provided a control program for a control apparatus of an elastic actuator drive mechanism, the control program causing a computer to function as:

a desired value output unit that outputs a desired value of an output of an elastic actuator;

an output error compensation unit that compensates an output error by receiving the desired value of the output of the elastic actuator and a measurement value of the output of the elastic actuator, the measurement value being measured by an output measurement unit;

a desired internal state decision unit that decides a desired value of the internal state of the elastic actuator with respect to a measurement value of the internal state, based on a relationship between the output and the internal state of the elastic actuator, with reference to the desired value of the output of the elastic actuator, the measurement value being measured by an internal state measurement unit;

an internal state error compensation unit that compensates an internal state error based on an output from the output error compensation unit and an output from the internal state measurement unit; and an abnormality determination unit that determines whether or not the output measurement unit is abnormal based on the measurement value of the output of the elastic actuator measured by the output measurement unit, the measurement value of the internal state of the elastic actuator measured by the internal state measurement unit, and the desired value of the output of the elastic actuator, wherein when the abnormality determination unit determines that the output measurement unit is abnormal, an operation of the output error compensation unit is stopped, and control is performed so that the elastic actuator continues to operate based on an output desired value as the output of the desired value output unit by the desired internal state decision unit and the internal state error compensation unit.

With such a configuration, the control for the elastic actuator drive mechanism, which enables continuous operation of the elastic actuator even when the output measurement unit has failed or is abnormal, can be realized.

The control apparatus for the elastic actuator drive mechanism according to the present invention is provided with the abnormality determination unit that determines whether or not the output measurement unit has failed, and when the output measurement unit has failed, it becomes possible to control the elastic actuator to continuously operate by using the desired internal state decision unit and the internal state error compensation unit.

Moreover, the control method and the control program for the elastic actuator drive mechanism according to the present invention are provided with the abnormality determination step of determining whether or not the output measurement unit has failed, and when the output measurement unit has failed, it becomes possible to control the elastic actuator to continuously operate by using the desired internal state decision unit and the internal state error compensation unit.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF PREFERRED EMBODIMENTS

Figure 1:
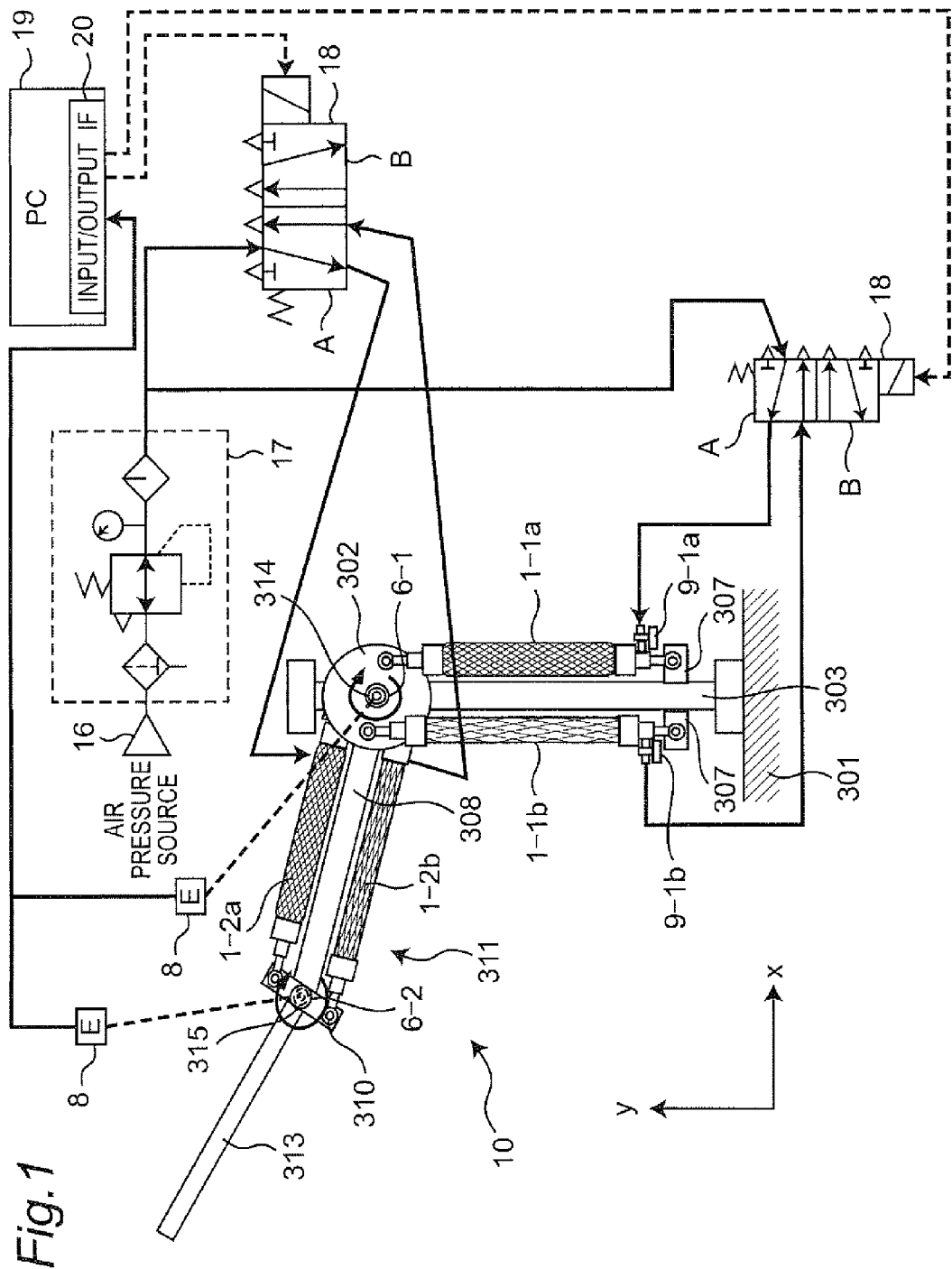
FIG. 1 is a view showing a structure of a drive mechanism of an elastic actuator in a first embodiment of the present invention.

Before the description of the present invention proceeds, it is to be noted that like parts are designated by like reference numerals throughout the accompanying drawings.

A description is made below in detail of embodiments according to the present invention based on the drawings.

Prior to the detailed description of embodiments of the present invention based upon the drawings, various aspects for the present invention will be explained.

According to a first aspect of the present invention, there is provided a control apparatus for an elastic actuator drive mechanism, comprising:

a desired value output unit that outputs a desired value of an output of an elastic actuator;

an output error compensation unit that compensates an output error by receiving the desired value of the output of the elastic actuator and a measurement value of the output of the elastic actuator, the measurement value being measured by an output measurement unit;

a desired internal state decision unit that decides a desired value of the internal state of the elastic actuator with respect to a measurement value of the internal state, based on a relationship between the output and the internal state of the elastic actuator, with reference to the desired value of the output of the elastic actuator, the measurement value being measured by an internal state measurement unit;

an internal state error compensation unit that compensates an internal state error based on an output from the output error compensation unit and an output from the internal state measurement unit; and an abnormality determination unit that determines whether or not the output measurement unit is abnormal based on the measurement value of the output of the elastic actuator measured by the output measurement unit, the measurement value of the internal state of the elastic actuator measured by the internal state measurement unit, and the desired value of the output of the elastic actuator, wherein when the abnormality determination unit determines that the output measurement unit is abnormal, an operation of the output error compensation unit is stopped, and control is performed so that the elastic actuator continues to operate based on an output desired value as the output of the desired value output unit by the desired internal state decision unit and the internal state error compensation unit.

According to a second aspect of the present invention, there is provided the control apparatus for an elastic actuator drive mechanism according to the first aspect, wherein when whether or not the output measurement unit is abnormal is determined by the abnormality determination unit, the output measurement unit is determined as abnormal in a case where the measurement value of the output of the elastic actuator is out of a predetermined range or in a case where a correspondence relationship between the measurement value of the output of the elastic actuator and the measurement value of the internal state of the elastic actuator measured by the internal state measurement unit, is out of predetermined relational information, and in other cases, the output measurement unit is determined as not abnormal.

According to a third aspect of the present invention, there is provided the control apparatus for an elastic actuator drive mechanism according to the first or second aspect, wherein the desired internal state decision unit comprises:

a normality-time desired internal state decision unit; and an abnormality-time desired internal state decision unit, and when the abnormality determination unit determines that the output measurement unit is not abnormal, operation control for the elastic actuator drive mechanism is performed by using an output of the normality-time desired internal state decision unit, whereas when the abnormality determination unit determines that the output measurement unit is abnormal, the operation control for the elastic actuator drive mechanism is performed by using an output of the abnormality-time desired internal state decision unit.

According to a fourth aspect of the present invention, there is provided the control apparatus for an elastic actuator drive mechanism according to the third aspect, wherein the abnormality-time desired internal state decision unit decides a desired internal state based on a static model of the elastic actuator drive mechanism.

According to a fifth aspect of the present invention, there is provided the control apparatus for an elastic actuator drive mechanism according to any one of the first to fourth aspects, further comprising:

an abnormality-time desired value generation unit that generates and outputs an abnormality-time desired value when the abnormality determination unit determines that the output measurement unit is abnormal.

According to a sixth aspect of the present invention, there is provided the control apparatus for an elastic actuator drive mechanism according to any one of the first to fifth aspects, further comprising:

an internal state measurement unit abnormality determination unit that determines whether or not the internal state measurement unit is abnormal; and an internal state abnormality-time instruction output unit that performs an output instruction to a drive device of the elastic actuator drive mechanism when the internal state measurement unit is abnormal, wherein when the internal state measurement unit abnormality determination unit determines that the internal state measurement unit is abnormal, the operation control for the elastic actuator drive mechanism is performed based on the output instruction of the internal state abnormality-time instruction output unit.

According to a seventh aspect of the present invention, there is provided the control apparatus for an elastic actuator drive mechanism according to any one of the first to sixth aspects, wherein the elastic actuator is a fluid pressure actuator.

According to an eighth aspect of the present invention, there is provided a control method for an elastic actuator drive mechanism, comprising:

outputting, by a desired value output unit, a desired value of an output of an elastic actuator;

compensating, by an output error compensation unit, an output error by receiving the desired value of the output of the elastic actuator and a measurement value of the output of the elastic actuator, the measurement value being measured by an output measurement unit;

deciding, by a desired internal state decision unit, a desired value of the internal state of the elastic actuator with respect to a measurement value of the internal state measured by an internal state measurement unit, based on a relationship between the output and the internal state of the elastic actuator, with reference to the desired value of the output of the elastic actuator;

compensating, by an internal state error compensation unit, an internal state error based on an output from the output error compensation unit and an output from the internal state measurement unit; and determining, by an abnormality determination unit, whether or not the output measurement unit is abnormal based on the measurement value of the output of the elastic actuator measured by the output measurement unit, the measurement value of the internal state of the elastic actuator measured by the internal state measurement unit, and the desired value of the output of the elastic actuator, wherein when the abnormality determination unit determines that the output measurement unit is abnormal, an operation of the output error compensation unit is stopped, and control is performed so that the elastic actuator continues to operate based on an output desired value as the output of the desired value output unit by the desired internal state decision unit and the internal state error compensation unit.

According to a ninth aspect of the present invention, there is provided a control program for a control apparatus of an elastic actuator drive mechanism, the control program causing a computer to function as:

a desired value output unit that outputs a desired value of an output of an elastic actuator;

an output error compensation unit that compensates an output error by receiving the desired value of the output of the elastic actuator and a measurement value of the output of the elastic actuator, the measurement value being measured by an output measurement unit;

a desired internal state decision unit that decides a desired value of the internal state of the elastic actuator with respect to a measurement value of the internal state, based on a relationship between the output and the internal state of the elastic actuator, with reference to the desired value of the output of the elastic actuator, the measurement value being measured by an internal state measurement unit;

an internal state error compensation unit that compensates an internal state error based on an output from the output error compensation unit and an output from the internal state measurement unit; and an abnormality determination unit that determines whether or not the output measurement unit is abnormal based on the measurement value of the output of the elastic actuator measured by the output measurement unit, the measurement value of the internal state of the elastic actuator measured by the internal state measurement unit, and the desired value of the output of the elastic actuator, wherein, when the abnormality determination unit determines that the output measurement unit is abnormal, an operation of the output error compensation unit is stopped, and control is performed so that the elastic actuator continues to operate based on an output desired value as the output of the desired value output unit by the desired internal state decision unit and the internal state error compensation unit.

A description is made below of the embodiments of the present invention with reference to the drawings.

First Embodiment

Figure 4:
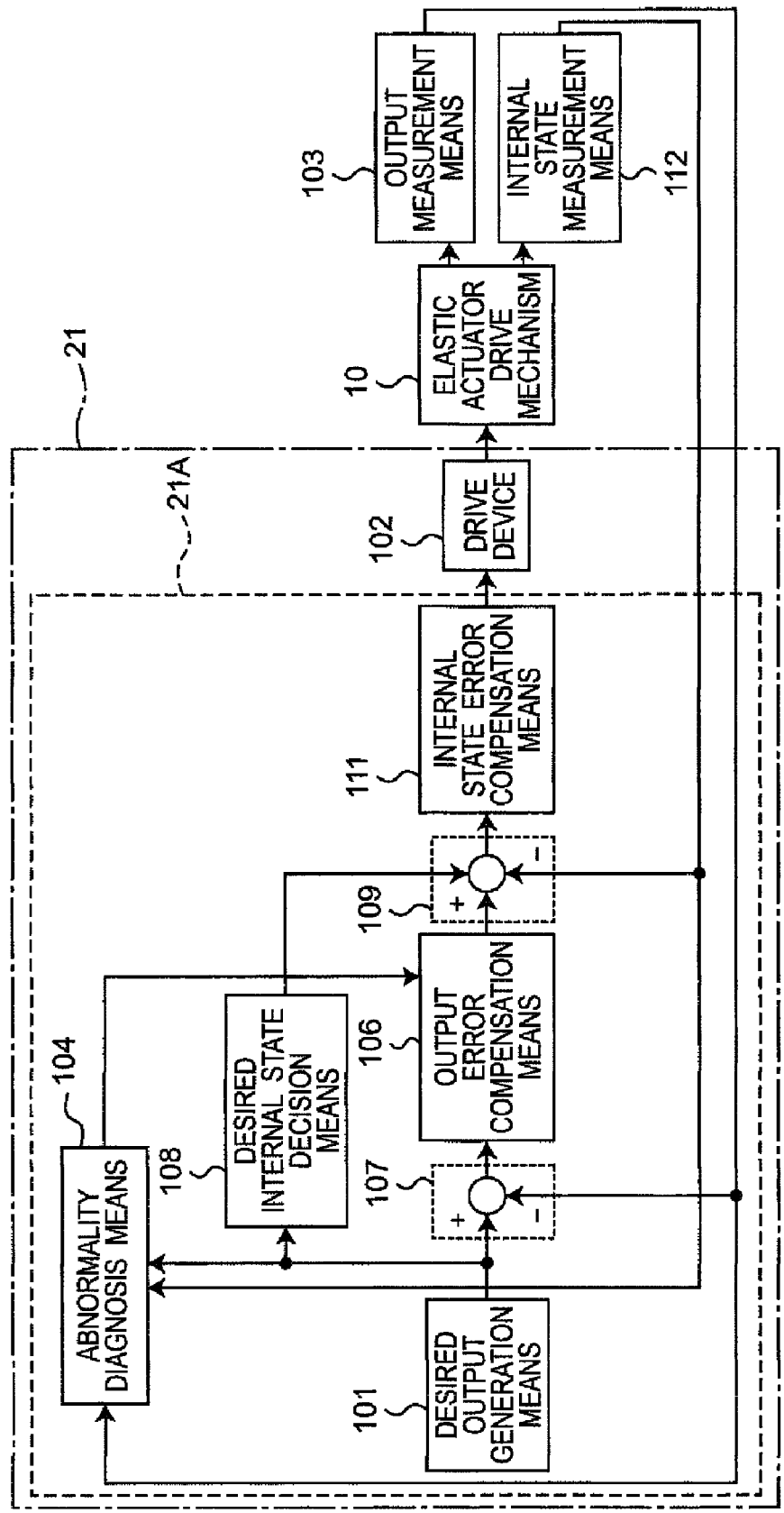
FIG. 4 is a block diagram showing concepts of a control apparatus and the like of the elastic actuator drive mechanism in the first embodiment the present invention.

FIG. 4 is a block diagram showing a concept of a control apparatus 21 for an elastic actuator drive mechanism 10 according to a first embodiment of the present invention. In FIG. 4, the elastic actuator drive mechanism 10 is a drive mechanism using a fluid pressure-driven actuator 100 that is driven by a fluid pressure and functions as an example of an elastic actuator.

The control apparatus 21 for the elastic actuator drive mechanism 10 is provided, for example, in a control computer 19 to be described later, and includes: a desired output generation means (unit) 101; a desired internal state decision means (unit) 108; an output error compensation means (unit) 106; an internal state error compensation means (unit) 111; an output error calculation part 107; an internal state error calculation part 109; an abnormality diagnosis means (unit) 104 that functions as an example of an abnormality determination means (unit); and a drive device 102. In the control apparatus 21, the desired output generation means 101, the desired internal state decision means 108, the output error compensation means 106, the internal state error compensation means 111, the output error calculation part 107, the internal state error calculation part 109, and the abnormality diagnosis means 104, which exclude the drive device 102, constitute a control apparatus main part 21A. Moreover, to the control apparatus 21, there is inputted measurement information coming from the elastic actuator drive mechanism 10, which is measured by an output measurement means 103 and an internal state measurement means 112.

The output measurement means 103 is connected to the elastic actuator drive mechanism 10, measures an output of the elastic actuator drive mechanism 10, and outputs a measurement value thereof to the output error calculation part 107 and the abnormality diagnosis means 104, respectively.

The internal state measurement means 112 is connected to the elastic actuator drive mechanism 10, measures a measurement value of an internal state of the elastic actuator drive mechanism 10, and inputs the measurement value to the internal state error calculation part 109 and the abnormality diagnosis means 104.

The desired output generation means 101 functions as an example of a desired value output means (unit), generates a desired value of an output of the elastic actuator drive mechanism 10, and outputs the desired value to the abnormality diagnosis means 104, the output error calculation part 107, and the desired internal state decision means 108.

The output error calculation part 107 calculates an output error based on the desired value of the output from the desired output generation means 101 and the measurement value of the output from the output measurement means 103, and outputs a calculation result to the output error compensation means 106.

When there is no input from the abnormality diagnosis means 104, the output error compensation means 106 outputs an output, which is corrected so as to reduce the output error inputted from the output error calculation part 107 to the output error compensation means 106, as an output error correction output to the internal state error calculation part 109, and controls the measurement value, which is measured by the output measurement means 103, to follow the desired value of the output from the desired output generation means 101. When there is an input from the abnormality diagnosis means 104, the output error compensation means 106 does not output anything. That is, the output error compensation means 106 outputs zero as the output error correction output toward the internal state error calculation part 109.

The desired internal state decision means 108 receives the desired value of the output of the desired output generation means 101, decides a desired value of the internal state of the elastic actuator drive mechanism 10, and outputs the desired value to the internal state error calculation part 109.

The internal state error calculation part 109 calculates an internal state error based on the output from the output error compensation means 106, the output (desired value of the internal state) from the desired internal state decision means 108, and the output from the internal state measurement means 112, and outputs the internal state error to the internal state error compensation means 111.

The internal state error compensation means 111 outputs a value, which is corrected so as to reduce the internal state error inputted from the internal state error calculation part 109, as an internal state error correction output to the drive device 102, and controls a measurement value measured by the internal state measurement means 112 to follow a value obtained by adding the output from the output error compensation means 106 and the output from the desired internal state decision means 108 to each other.

The drive device 102 drives the elastic actuator drive mechanism 10 based on the output of the internal state error compensation means 111. Specifically, the drive device 102 indicates an air pressure supply system including a five-port flow rate control electromagnetic valve 18 and the like in FIG. 3, which will be described later.

The abnormality diagnosis means 104 diagnoses whether or not abnormality occurs in the output measurement means 103 based on the output of the output measurement means 103, the output of the internal state measurement means 112, and the output of the desired output generation means 101. When the abnormality diagnosis means 104 diagnoses that the abnormality has occurred in the output measurement means 103, an abnormality detection signal is outputted from the abnormality diagnosis means 104 to the output error compensation means 106. When the abnormality diagnosis means 104 diagnoses that abnormality has not occurred in the output measurement means 103, the abnormality detection signal is not outputted from the abnormality diagnosis means 104 to the output error compensation means 106.

Figure 5:
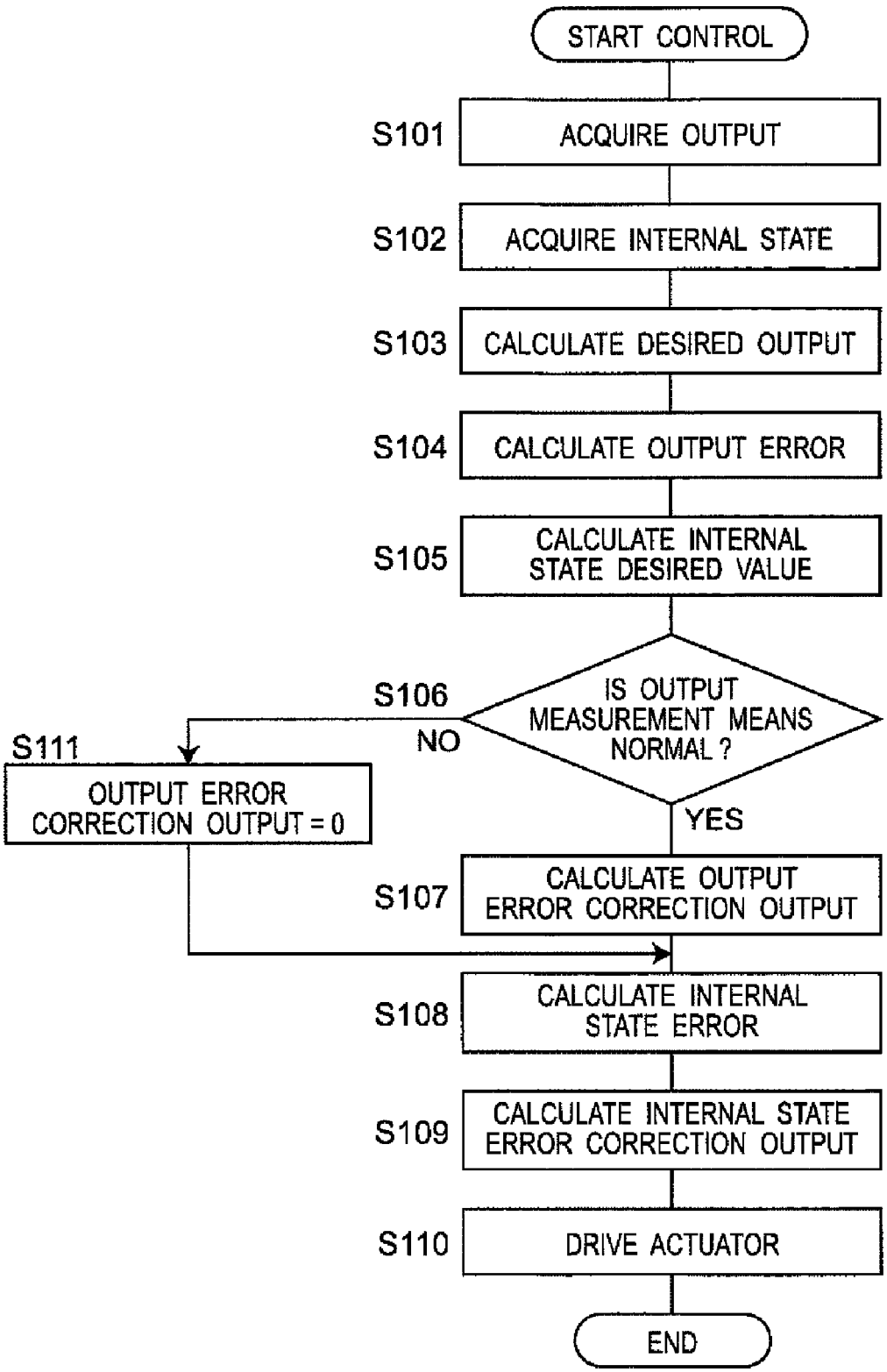
FIG. 5 is a flowchart of actual operation steps of a control program, showing the concept of the control apparatus of the elastic actuator drive mechanism in the first embodiment of the present invention.

Actual operation steps of a control program, which is based on the above principle, are described based on a flowchart of FIG. 5.

In step S101, the measurement value of the output of the elastic actuator drive mechanism 10, which is measured by the output measurement means 103, is read into the control apparatus 21.

Subsequently, in step S102, the measurement value of the internal state of the elastic actuator drive mechanism 10, which is measured by the internal state measurement means 112, is read into the control apparatus 21.

Subsequently, in step S103, based on an operation program of the elastic actuator drive mechanism 10, which is previously stored in the desired output generation means 101, the desired output generation means 101 calculates the desired value of the output of the elastic actuator drive mechanism 10.

Subsequently, in step S104, the output error, i.e., a difference between the desired value of the output, which is calculated by the desired output generation means 101, and the measurement value of the present output, which is measured by the output measurement means 103, is calculated by the output error calculation part 107.

Subsequently, in step S105, based on the desired value of the output from the desired output generation means 101, the desired internal state decision means 108 calculates the desired value of the internal state.

Subsequently, in Step S106, based on the desired value of the output, which is the output of the desired output generation means 101, the measurement value of the output, which is the output of the output measurement means 103, and the measurement value of the internal state, which is the output of the internal state measurement means 112, the abnormality diagnosis means 104 determines whether or not the output measurement means 103 is operating normally. When the abnormality diagnosis means 104 determines that the output measurement means 103 is operating normally, steps S107 to S110 are performed. On the other hand, when the abnormality diagnosis means 104 determines that the output measurement means 103 is not operating normally (in other words, abnormal), steps S111, and S108 to S110 are performed, and an abnormality signal is outputted to the output error compensation means 106.

A description is made below of the case where the abnormality diagnosis means 104 determines in step S106 that the output measurement means 103 is operating normally.

Subsequently to step S106, in step S107, the output error correction output is calculated by the output error compensation means 106 based on the output error calculated by the output error calculation part 107.

Subsequently, in step S108, the measurement value of the internal state, which is measured in step S102 is subtracted from the value obtained by adding the output error correction output calculated by the output error compensation means 106 in step S107 and the desired value of the internal state, which is calculated by the desired internal state decision means 108 in step S103, to each other, whereby the internal state error is calculated by the internal state error calculation part 109.

Subsequently, in step S109, the internal state error correction output is calculated by the internal state error compensation means 111 based on the internal state error calculated by the internal state error calculation part 109 in step S108.

Subsequently, in step S110, the internal state error correction output calculated by the internal state error compensation means 111 in step S109 is given from the internal state error compensation means 111 to the drive device 102, and the elastic actuator drive mechanism 10 is driven by the drive device 102.

Step S101 to step S110 described above are repeatedly executed as a calculation loop of the control, whereby the control for the elastic actuator drive mechanism 10 is realized.

Meanwhile, a description is made below of the case where the abnormality diagnosis means 104 determines in step S106 that the output measurement means 103 is not operating normally.

Subsequently to step S106, in step S111, the output error compensation means 106 outputs the output error correction output as zero regardless of the output error.

Subsequently, in step S108, the measurement value of the internal state, which is measured in step S102, is subtracted from a value obtaining by adding the output error correction output (=0) outputted by the output error compensation means 106 in step S111 and the desired value of the internal state, which is calculated by the desired internal state decision means 108 in step S103, whereby the internal state error is calculated by the internal state error calculation part 109.

Subsequently, in step S109, the internal state error correction output is calculated by the internal state error compensation means 111 based on the internal state error calculated by the internal state error calculation part 109 in step S108.

Subsequently, in step S110, the internal state error correction output calculated by the internal state error compensation means 111 in step S109 is given from the internal state error compensation means 111 to the drive device 102, and the elastic actuator drive mechanism 10 is driven by the drive device 102.

Step S101 step S110 described above are repeatedly executed as a calculation loop of the control, whereby the control for the elastic actuator drive mechanism 10 is realized.

Next, a description is made of an example of a specific configuration of the control apparatus 21 for the elastic actuator drive mechanism 10 of the first embodiment.

FIG. 1 is a view showing a configuration of the elastic actuator drive mechanism 10 according to the first embodiment of the present invention. The elastic actuator drive mechanism 10 is a two-degree-of-freedom robot arm, and includes: a first joint shaft 6-1 that rotates forward and reverse in an xy plane including an x-axis and a y-axis perpendicular to each other; and a second joint shaft 6-2 that also rotates forward and reverse in the xy plane. In FIG. 1, reference numerals 1-1a, 1-1b, 1-2a, and 1-2b denote elastic expansion/contraction structures. These reference numerals denote the individual elastic expansion/contraction structures (examples of the elastic actuators), and when the elastic expansion/contraction structure is representatively indicated, reference numeral 1 denote the expansion/contraction structures. The first joint shaft 6-1 and the second joint shaft 6-2 are a rotation axis of a first joint 6 of the elastic actuator drive mechanism 10 and a rotation axis of a second joint 6 thereof, respectively.

Figure 2:
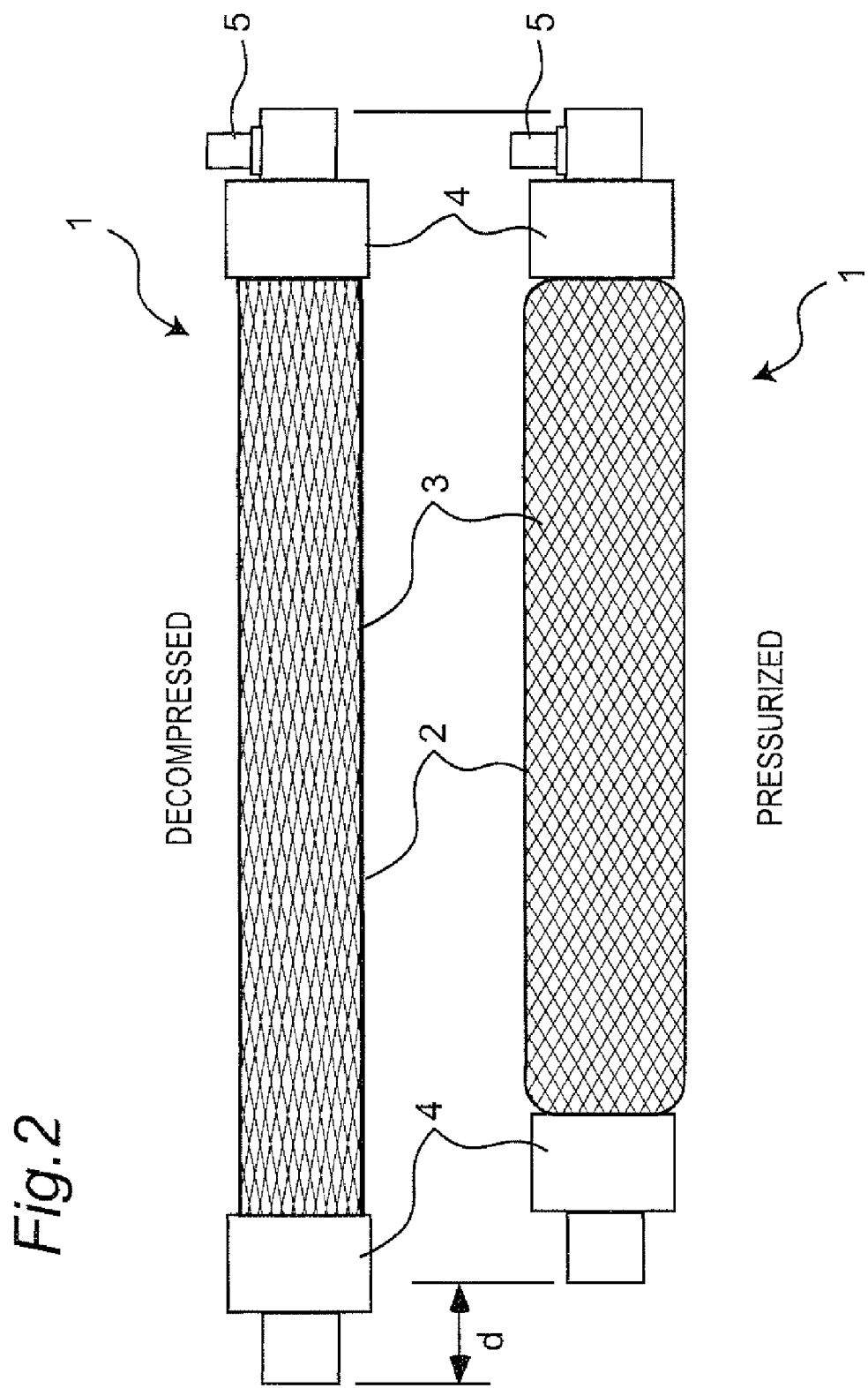
FIG. 2 is a view showing a structure and operation of an elastic expansion/contraction structure as an example of the elastic actuator in the first embodiment of the present invention.

As shown in FIG. 2, in the elastic expansion/contraction structure 1, a deformation direction regulation member 3, which is knitted in a mesh shape with resin or metal fiber cords less likely to extend in terms of material, is arranged on an outer surface of a tubular hollow elastic body 2 that is formed of a rubber material and functions as a drive means. The deformation direction regulation member 3 is formed such that deformation in a radius direction of the tubular elastic body 2 due to expansion can be converted into length contraction in an axial direction thereof perpendicular to the radius direction, whereas deformation in the radius direction of the tubular elastic body 2 due to contraction can be converted into length expansion in the axial direction. Both end portions of the tubular elastic body 2 are hermetically sealed by sealing members 4, respectively. A tubular fluid passage member 5 provided on the sealing member 4 on one of the end portions has therein a fluid passage through which a compressive fluid passes. Through the tubular fluid passage member 5, it becomes possible for the fluid to be injected into a hollow inside of the hollow elastic body 2 or to be ejected therefrom. The compressive fluid such as air is supplied through the fluid passage member 5 to the hollow tubular elastic body 2.

When an internal pressure is given to an internal space of the tubular elastic body 2 by the compressive fluid supplied thereto, the tubular elastic body 2 attempts to expand mainly in the radius direction. However, such a motion in the radius direction is converted into a motion in a central axial direction of the tubular elastic body 2 by action of the deformation direction regulation member 3, and an overall length of the tubular elastic body 2 contracts, and accordingly, the tubular elastic body 2 is usable as a linear-drive elastic actuator 100.

The elastic actuator drive mechanism 10 arranges a pair of the elastic expansion/contraction structures 1 so as to be opposed to each other about the joint shaft 6-1 or 6-2 taken as a fulcrum. In the pair of elastic expansion/contraction structures 1, one elastic expansion/contraction structure 1 contracts, and the other elastic expansion/contraction structure 1 extends. Then, an antagonistic-type drive structure is adopted, in which force acts through the fulcrum (joint shaft 6-1 or 6-2), and then, the joint shaft 6-1 or 6-2 rotates. In this manner, forward and reverse rotation motions of the joint shaft 6-1 or 6-2 can be realized. Specifically, the first joint shaft 6-1 rotates forward and reverse by the antagonistic drives of the elastic expansion/contraction structure 1-1a and the elastic expansion/contraction structure 1-1b. The second joint shaft 6-2 rotates forward and reverse by the antagonistic drives of the elastic expansion/contraction structure 1-2a and the elastic expansion/contraction structure 1-2b.

On an upper end of a stick-like support member 303 in which a lower end is fixed to a fixed floor 301, a disc-like support body 302 is freely rotatably supported concentrically with the first joint shaft 6-1. Onto a fixed floor 301 side of a lower end portion of the support member 303, a stick-like support body 307 extending perpendicularly to a longitudinal direction of the support member 303 is fixed. Between the disc-like support body 302 and the support body 307, respective end portions of the elastic expansion/contraction structures 1-1a and 1-1b are freely rotatably coupled. Hence, by the antagonistic drives of the elastic expansion/contraction structures 1-1a and 1-1b, the disc-like support body 302 rotates forward and reverse about a support shaft 314 of the first joint shaft 6-1 in the xy plane. As a result, a front arm 311 and a stick-like drive shaft 313 of the elastic actuator drive mechanism 10, which are coupled to the disc-like support body 302, can be rotated forward and reverse integrally with each other.

A stick-like support member 308 of the front arm 311 has a base end thereof fixed to the disc-like support body 302, and is made rotatable integrally with the disc-like support body 302.

Moreover, onto a tip end side of the support member 308, a center of a stick-like support body 310 fixed so as to extend perpendicularly to a longitudinal direction of the support member 308 is coupled rotatably about a shaft center of the second joint shaft 6-2. Between the disc-like support body 302 of the support member 308 and the support body 310 on the tip end side thereof, respective end portions of the elastic expansion/contraction structures 1-2a and 1-2b are coupled freely rotatably. Hence, by the antagonistic drives of the elastic expansion/contraction structures 1-2a and 1-2b, the support body 310 rotates forward and reverse about a support shaft 315 of the second joint shaft 6-2 in the xy plane. As a result, a drive member 313 of the drive mechanism 10 of the elastic actuator 100, which is coupled to the support body 310, can be relatively rotated forward and reverse.

Pressure sensors 9-1a and 9-1b are examples of the internal state measurement means (unit) 112 that measures respective internal states (internal pressures as examples) of the elastic expansion/contraction structures 1-1a and 1-1b. The pressure sensors 9-1a and 9-1b are arranged on the respective fluid passage members 5 (fluid injection/ejection ports) of the elastic expansion/contraction structures 1-1a and 1-1b, and measure the pressures in the respective elastic expansion/contraction structures 1-1a and 1-1b. Similarly, pressure sensors 9-2a and 9-2b (refer to FIG. 11) as examples of the internal state measurement means (unit) 112 are also arranged on the elastic expansion/contraction structures 1-2a and 1-2b.

As will be described later, flow-rate proportional electromagnetic valves 18 are connected to the elastic expansion/contraction structures 1-1a and 1-1b, and the elastic expansion/contraction structures 1-2a and 1-2b, respectively. All of the flow-rate proportional electromagnetic valves 18 are connected to the control computer 19 configured by a general personal computer as an example of the control means (unit). Through the flow-rate proportional electromagnetic valves 18, the control computer 19 controls the respective contraction and extension operations of the elastic expansion/contraction structures 1-1a and 1-1b and the elastic expansion/contraction structures 1-2a and 1-2b independently of each other. Moreover, for the respective joint shafts 6-1 and 6-2, displacement measurement means (encoders 8 as examples in this first embodiment) as examples of output measurement means are arranged, and joint angles of the respective joint shafts 6-1 and 6-2 are measurable by the respective encoders 8. On the respective elastic expansion/contraction structures 1, the pressure measurement means (pressure sensors 9 (9-1a, 9-1b, 9-2a, 9-2b) as examples in this first embodiment) as examples of the internal state measurement means (unit) are arranged, and the internal pressures of the respective elastic expansion/contraction structures 1 are measurable by the pressure sensors 9.

Figure 20:
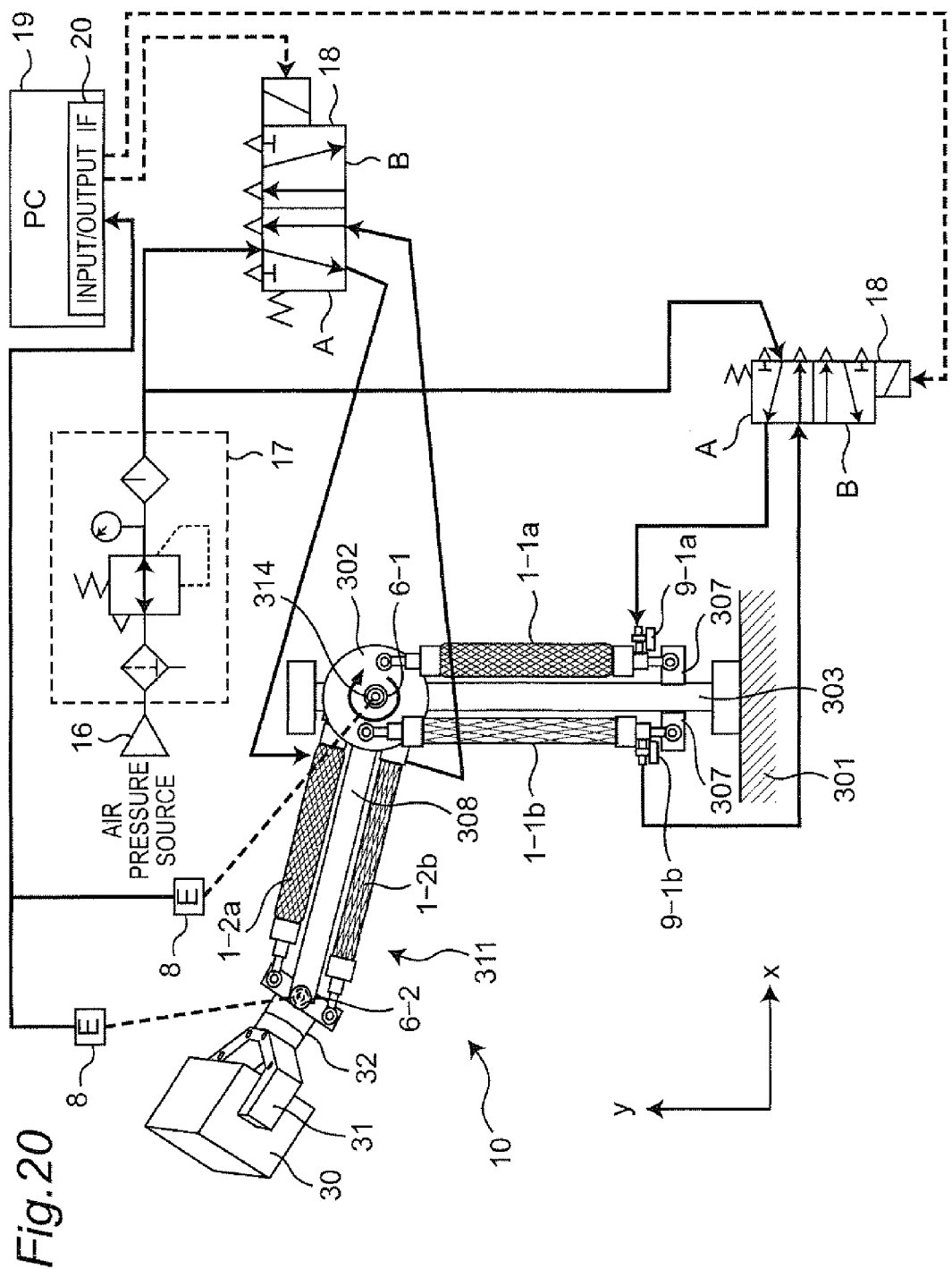
FIG. 20 is a view showing an elastic actuator drive mechanism, which is provided with a hand, in the first embodiment of the present invention.

With the structure as described above, for example, in the case where a hand capable of grasping an object is attached in place of the drive shaft 313 utilizing multiple degrees of freedom, basic functions of the elastic actuator drive mechanism 10 such as grasping and transporting of the object can be realized. FIG. 20 shows an example of the elastic actuator drive mechanism 10 attached with the hand. An opening/closing motor 32 is attached to the hand 31, and this motor 32 is operated, whereby a transport object 30 can be grasped by closing the hand 31. A position and orientation of this hand 31 is described below as a hand position and orientation.

Figure 3:
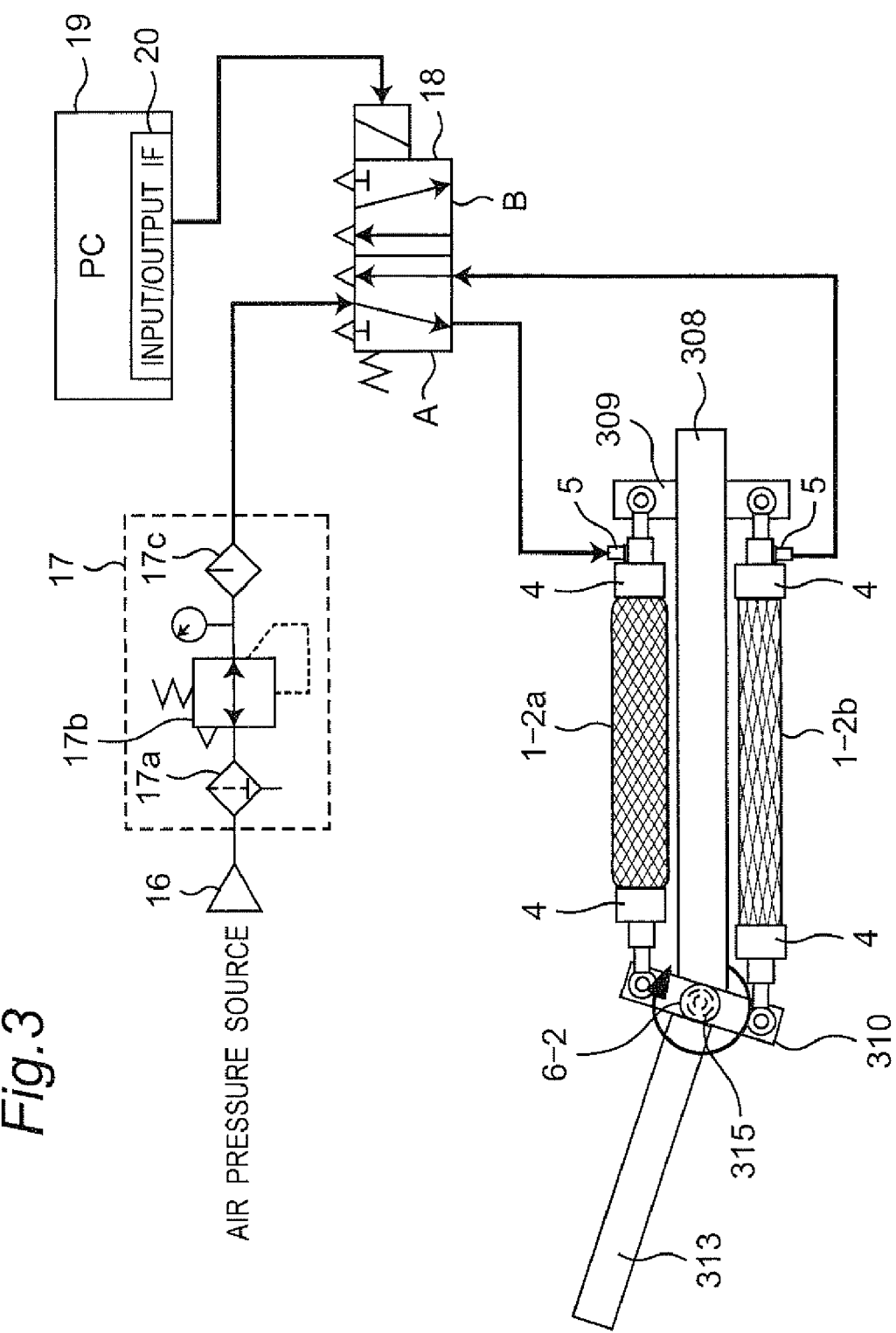
FIG. 3 is a view showing an operation of an air pressure supply system for driving a robot arm by air as a compressive fluid in the first embodiment of the present invention.

FIG. 3 is a view showing a configuration of the air pressure supply system for driving the elastic actuator drive mechanism 10 according to the first embodiment of the present invention.

FIG. 3 illustrates only a portion of the drive mechanism 10 of the elastic actuator, where the second joint shaft 6-2 is driven to rotate forward and reverse, and other portions are omitted. A portion of the drive mechanism 10 of the elastic actuator, where the first joint shaft 6-1 is driven to rotate forward and reverse, also has a similar structure, and functions in a similar way.

In FIG. 3, reference numeral 16 denotes an air pressure source, for example, a compressor or the like, and reference numeral 17 denotes an air pressure adjustment means in which an air pressure filter 17a for the air pressure source 16, an air pressure reduction valve 17b, and a lubricator 17c for the air pressure form one set. The five-port flow rate control electromagnetic valve 18 as an example of the flow-rate proportional electromagnetic valve controls the flow rate by driving a spool valve and the like by force of an electromagnet. The control computer 19 mounts thereon an input/output IF 20 such as a D/A board, and outputs a voltage instruction value to the five-port flow rate control electromagnetic valve 18, thus making it possible to independently control each flow rate of the air flowing through each fluid passage member 5.

Next, a description is made of an operation of the air pressure supply system shown in FIG. 3. High-pressure air generated by the air pressure source 16 is reduced in pressure by the air pressure adjustment means 17, is adjusted to a constant pressure such as 600 [kPa], for example, and is supplied to the five-port flow rate control electromagnetic valve 18. An opening degree of the five-port flow rate control electromagnetic valve 18 is controlled in proportion to the voltage instruction value outputted from the control computer 19 through the input/output IF 20. In the case where a positive voltage instruction value is inputted from the control computer 19 to the five-port flow rate control electromagnetic valve 18, a state indicated by reference symbol A as an air pressure circuit symbol is brought. Then, a flow passage from the air pressure source 16 side to the elastic expansion/contraction structure 1-2a side opens, and air with a flow rate proportional to an absolute value of the voltage instruction value is supplied to the elastic expansion/contraction structure 1-2a side. Moreover, on the elastic expansion/contraction structure 1-2b side, a flow passage to an atmospheric pressure side opens, and an airflow with a flow rate proportional to the absolute value of the voltage instruction value is exhausted into the atmosphere from the elastic expansion/contraction structure 1-2b side.

Hence, as shown in FIG. 2, an overall length of the elastic expansion/contraction structure 1-2a contracts, and an overall length of the elastic expansion/contraction structure 1-2b extends, whereby the second joint shaft 6-2 performs a right rotation motion at a speed proportional to the absolute value of the voltage instruction value. Meanwhile, in the case where a negative voltage instruction value is inputted from the control computer 19 to the five-port flow rate control electromagnetic valve 18, a state indicated by reference symbol B as an air pressure circuit symbol is brought. Then, operations of the elastic expansion/contraction structures 1-2a and 1-2b become opposite from the above (that is, the overall length of the elastic expansion/contraction structure 1-2a extends, and the overall length of the elastic expansion/contraction structure 1-2b contracts), whereby the second joint shaft 6-2 performs a left rotation operation.

In other words, an airflow supplied from the five-port flow rate control electromagnetic valve 18 to the elastic expansion/contraction structure 1 side passes through the sealing member 4 by the fluid passage member 5, reaches the inside of the tubular elastic body 2, and generates the internal pressure of the tubular elastic body 2. The tubular elastic body 2 expands by the generated internal pressure; however, by a constraining function (regulating function) of the fiber cords of the deformation direction regulation member 3, which are knitted in the mesh shape, the deformation in the radius direction of the tubular elastic body 2 due to the expansion is regulated and converted into the contraction of the length thereof in the axial direction. As a result, as shown in an upper side of FIG. 3 (lower side in FIG. 2), the overall length of the elastic expansion/contraction structure 1 is shortened. Meanwhile, if the air is exhausted into the atmosphere from the five-port flow rate control electromagnetic valve 18, and the internal pressure of the tubular elastic body 2 is reduced, the tubular elastic body 2 restores by its elastic force to eliminate the expansion, and the overall length of the elastic expansion/contraction structure 1 extends as shown in a lower side of FIG. 3 (upper side of FIG. 2).

As a result, if it is assumed that right ends of the tubular elastic bodies 2 are fixed in FIG. 2, a difference of a distance d occurs between lefts ends thereof by the above-described extension and contraction. Hence, it is possible for each of the elastic expansion/contraction structures 1 in the first embodiment to be allowed to function as an actuator with translation displacement by controlling the supply of the air pressure thereto. Extension and contraction amounts of the elastic expansion/contraction structure 1 are substantially proportional to the internal pressure thereof. Accordingly, if the flow rate of the air to be supplied to the elastic expansion/contraction structure 1 is controlled by controlling the five-port flow rate control electromagnetic valve 18 by the control computer 19, the overall length of the elastic expansion/contraction structure 1 can be controlled.

In the elastic actuator drive mechanism 10 shown in FIG. 1, for the antagonistic drives of the elastic expansion/contraction structures 1-1a and 1-1b, and for the antagonistic drives of the elastic expansion/contraction structures 1-2a and 1-2b, the five-port flow rate control electromagnetic valves 18 are respectively arranged for the pairs of antagonistic elastic expansion/contraction structures 1, and an air pressure supply system similar to that in FIG. 3 is configured. Then, by the voltage instruction values outputted from the control computer 19 through the D/A board 20 to the respective five-port flow rate control electromagnetic valves 18, all of the joint shafts 6-1 and 6-2 of the elastic actuator drive mechanism can be driven to rotate forward and reverse simultaneously and independently.

Figure 6:
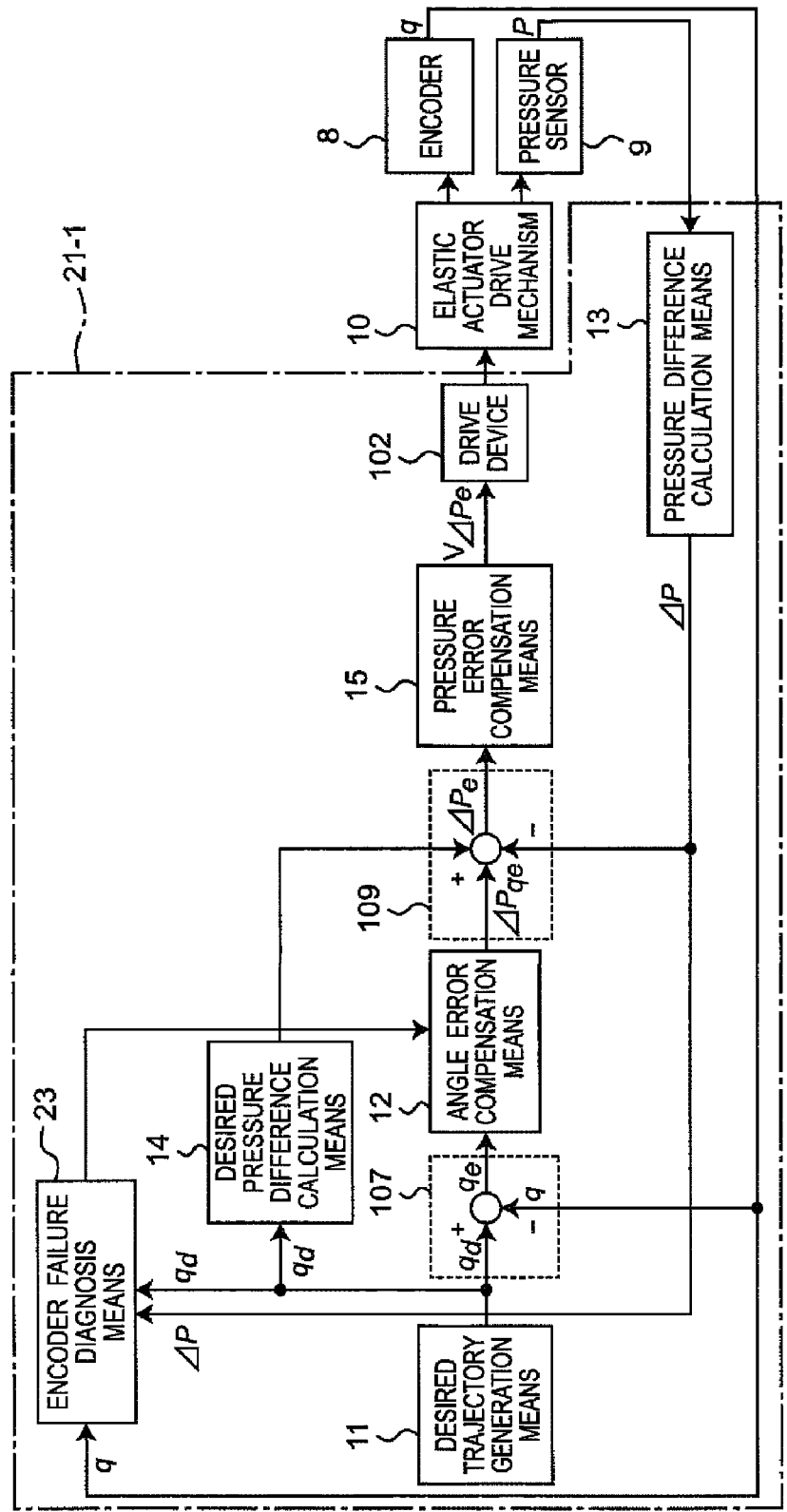
FIG. 6 is a control block diagram of the elastic actuator control apparatus and the like in the first embodiment of the present invention.

FIG. 6 is a view showing specific configurations of the elastic actuator drive mechanism 10 according to the first embodiment of the present invention, and of a control apparatus 21-1 and the like thereof. The control apparatus 21-1 is provided, for example, in the control computer 19 described above, and includes: a desired trajectory generation means (unit) 11; a desired pressure difference calculation means (unit) 14; an angle error compensation means (unit) 12; a pressure difference calculation means (unit) 13; a pressure difference error compensation means (unit) 15; an output error calculation part 107; an internal state error calculation part 109; an encoder failure diagnosis means (unit) 23; and the drive device 102. Note that, in FIG. 6, reference numeral 10 denotes the elastic actuator drive mechanism shown in FIG. 1, which is a control desired of the control apparatus 21-1 for the elastic actuator drive mechanism. The elastic actuator drive mechanism 10 outputs: present values (joint angle vectors) $q=[q_1, q_2]^T$ of joint angles, which are examples of the measurement values measured by the encoders 8 of the respective joint shafts 6-1 and 6-2; and internal pressures $P=[P_{1a}, P_{1b}, P_{2a}, P_{2b}]^T$ of the elastic expansion/contraction structures 1, which are examples of the internal state measurement values measured by the pressure sensors 9 of the respective elastic expansion/contraction structures 1. Note that reference symbols $q_1$ and $q_2$ are joint angles of the first joint shaft 6-1 and the second joint shaft 6-2, which are measured by the encoders 8, respectively. Moreover, reference symbols $P_{1a}$, $P_{1b}$, $P_{2a}$, and $P_{2b}$ are internal pressures of the elastic expansion/contraction structures 1-1a, 1-1b, 1-2a, and 1-2b, which are measured by the pressure sensors 9 (9-1a, 9-1b, 9-2a, 9-2b), respectively.

The pressure difference calculation means 13 receives the internal pressures P (measurement values P) measured by the pressure sensors 9, calculates pressure differences $\Delta P=[\Delta P_1, \Delta P_2]^T=[P_{1a}-P_{1b}, P_{2a}-P_{2b}]^T$ from the measurement values P of the pressure sensors 9, and outputs the pressure differences $\Delta P$ to the internal state error calculation part 109 and the encoder failure diagnosis means (unit) (encoder abnormality diagnosis means (unit)) 23.

The desired trajectory generation means 11 outputs a desired joint angle vector $q_d$, which serves for realizing the desired operation of the elastic actuator drive mechanism 10, to the output error calculation part 107, the encoder failure diagnosis means 23, and the desired pressure difference calculation means 14. With regard to such an operation of the elastic actuator drive mechanism 10, which is taken as a desired, desired angle vectors $q_{dt}=[q_{dt1}, q_{dt2}]^T (q_{d0}, q_{d1}, q_{d2}, \ldots)$ for each point each time ($t=0, t=t_1, t=t_2$, are recorded in advance in response to work taken as an object. For example, such desired angle vectors are recorded as an operation program for the elastic actuator drive mechanism 10. Then, by using polynomial interpolation based on information about the angles ($q_{d0}, q_{d1}, q_{d2}, \ldots$) for each point at each time ($t=0, t=t_1, t=t_2 \ldots$), the desired trajectory generation means 11 supplements a trajectory among the respective points, and generates the desired joint angle vector $q_d=[q_{d1}, q_{d2}]^T$.

The output error calculation part 107 receives the desired joint angle vector $q_d$, which is outputted from the desired trajectory generation means 11, and the outputs q of the encoders 8, calculates an angle error vector $q_e=q_d-q$, and outputs the angle error vector $q_e$ as an example of the output error.

The angle error compensation means 12 as an example of the output error compensation means (unit) 106 receives the angle error vector $q_e$ outputted by the output error calculation part 107, and outputs an angle error correction instruction value $\Delta P_{qe}$ as an example of the control instruction value to the internal state error calculation part 109. When the encoder has failed, an abnormality signal of the encoder failure diagnosis means 23 is inputted to the angle error compensation means 12.

The desired pressure difference calculation means as an example of the desired internal state decision means (unit) 108 receives the desired joint angle vector $q_d$ outputted from the desired trajectory generation means 11, calculates a desired, pressure difference (desired value of the pressure difference) $\Delta P_d=[\Delta P_{1d}, \Delta P_{2d}]^T$ from the desired joint angle vector $q_d$, and outputs the desired pressure difference to the desired internal state error calculation part 109. Note that $\Delta P_{1d}$ and $\Delta P_{2d}$ are a desired value of the pressure difference between the elastic expansion/contraction structures 1-1a and 1-1b, and a desired value of the pressure difference between the elastic expansion/contraction structures 1-2a and 1-2b, respectively.

Figure 7:
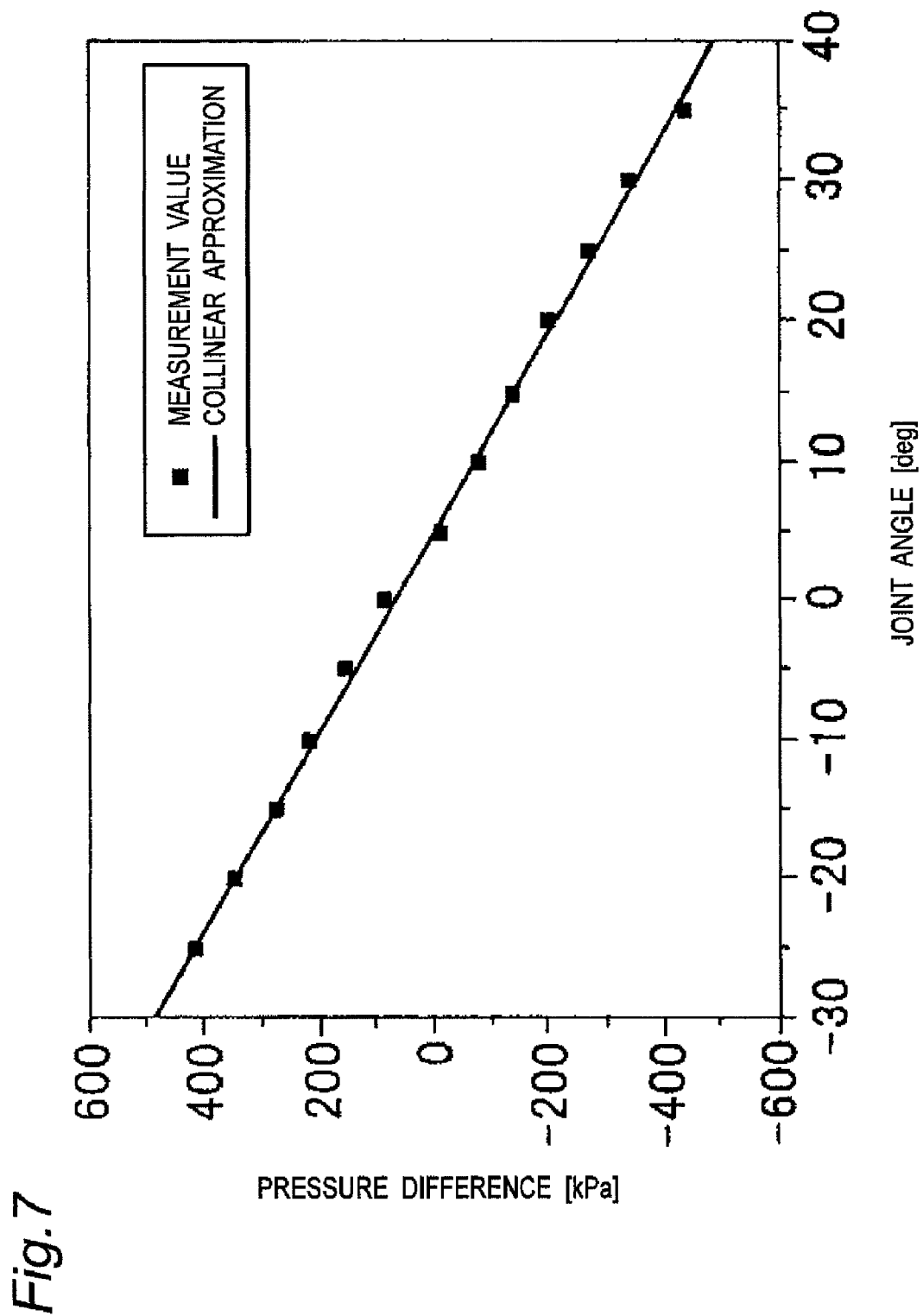
FIG. 7 is a graph showing a state when the drive mechanism of the elastic actuator is operated in the first embodiment of the present invention.

Here, FIG. 7 is a graph showing an example of an equation previously stored in the desired pressure difference calculation means 14. The desired pressure difference calculation means 14 has the equation shown in FIG. 7 therein, and by using this equation, calculates the desired pressure difference $\Delta P_d$ from the desired joint angle vectors $q_d$ inputted thereto. For example, when the desired joint angle vectors $q_d$ is $q_d$ [0, $-10]^T$, the desired pressure difference $P_d$ becomes $\Delta P_d=[0, 200]^T$.

Returning to FIG. 6, the internal state error calculation part 109 adds the desired pressure difference $\Delta P_d$ outputted from the desired pressure difference calculation means 14, and the angle error correction instruction value $\Delta P_{qe}$ outputted from the angle error compensation means 12, to each other, subtracts the pressure difference $\Delta P$ outputted from the pressure difference calculation means 13 from a value thus obtained by the addition, and calculates the pressure difference error (pressure error value) $\Delta P_e$. Then, the internal state error calculation part 109 outputs the calculated pressure difference error (pressure error value) $\Delta P_e$ to the pressure difference error compensation means 15.

The pressure difference error compensation means 15 as an example of the internal state error compensation means (unit) 111 receives the pressure difference error $\Delta P_e$ from the internal state error calculation part 109, calculates a pressure difference error correction output $V_{\Delta pe}$, and outputs the calculated pressure difference error correction output $V_{\Delta pe}$ to the drive device 102 for the elastic actuator drive mechanism 10. The pressure difference error correction output $V_{\Delta pe}$ is given as a voltage instruction value through the input/output IF 20 such as the D/A board to the five-port flow rate control electromagnetic valves 18 of the air pressure supply system, which are examples of the drive device 102, and the respective joint shafts 6-1 and 6-2 are driven to rotate forward and reverse independently of each other, whereby the elastic actuator drive mechanism 10 operates.

The encoder failure diagnosis means (unit) (encoder abnormality diagnosis means (unit)) 23 as an example of the abnormality diagnosis means (unit) 104 diagnoses whether or not the output (joint angle vector) of each of the encoders 8 is normal based on the output (joint angle vector) q of the encoder 8, the output (desired joint angle vector) $q_d$ of the desired trajectory generation means 11, and the output (pressure difference) $\Delta P$ from the pressure difference calculation means 13. As a result of the diagnosis, in the case where it is determined by the encoder failure diagnosis means 23 that the output of the encoder 8 is not normal, that is, is abnormal, an abnormality notification signal is outputted from the encoder failure diagnosis means 23 to the angle error compensation means 12. On the other hand, as a result of the diagnosis, in the case where it is determined by the encoder failure diagnosis means 23 that the output of the encoder 8 is normal, the abnormality notification signal is not outputted from the encoder failure diagnosis means 23 to the angle error compensation means 12. Alternatively, in the case where it is determined by the encoder failure diagnosis means 23 that the output of the encoder 8 is normal, a normality notification signal is outputted from the encoder failure diagnosis means 23 to the angle error compensation means 12.

As an example for determination of whether or not the output of the encoder 8 is normal by the encoder failure diagnosis means 23, such a method as follows is used. For example, in the case where the output (joint angle vector) q of the encoder 8 exceeds a designed movable angle of the joint shaft 6 by a fixed value or more, the encoder failure diagnosis means 23 determines that the encoder 8 is abnormal. Moreover, for example, in the case where a designed movable angle range of the joint shaft 6 is ±60 degrees, if an absolute value of the output q of the encoder 8 takes a value exceeding 60 degrees, the encoder failure diagnosis means 23 determines that the encoder abnormal (for example, has failed). Moreover, for example, there is a reachable speed in the rotation speed of the joint shaft 6, and accordingly, in the case where the output (joint angle vector) q of the encoder 8 is varied by a fixed value or more within a predetermined time, the encoder failure diagnosis means 23 determines that the encoder 8 is abnormal (for example, has failed). Moreover, as another example of abnormality, in the case where there are no variations in the output (joint angle vector) q of the encoder 8 although the output (pressure difference) $\Delta P$ from the pressure difference calculation means 13 is varied so as to correspond to the fact that the desired joint angle vector $q_d$ is varied in order to detect the case where the encoder 8 has failed and does not operate, the encoder failure diagnosis means 23 determines that the encoder 8 is abnormal. With regard to the diagnosis that the encoder 8 is abnormal, the encoder failure diagnosis means 23 determines that the encoder 8 is abnormal if at least one of the above-described conditions is satisfied. In other words, in the case where the measurement value of the output of the elastic actuator 100 is out of a predetermined range, or in the case where a correspondence relationship between the measurement value of the output of the elastic actuator 100 and the measurement value of the internal state (pressure P) of the elastic actuator 100, which is measured by the pressure sensor 9 as an example of the internal state measurement means (unit), is out of predetermined relational information, it is determined that the encoder 8 is abnormal. Otherwise, it is determined that the encoder 8 is not abnormal (is normal). In this application, "failure" is treated as one aspect of "abnormality"

In the case of having received the abnormality signal of the encoder 8 from the encoder failure diagnosis means 23, the angle error compensation means 12 as an example of the output error compensation means (unit) 106 does not output the angle error correction instruction value $\Delta P_{qe}$ (in other words, sets $\Delta P_{qe}$ at zero ($\Delta P_{qe}$=0) regardless of the value of the angle error vector $q_e$ outputted by the output error calculation part 107.

The input/output IF 20 such as the D/A board and the five-port flow rate control electromagnetic valves 18 in the air pressure supply system, as an example of the drive device 102, drive the joints 6 based on the angle error correction instruction value $V_{\Delta pe}$ as the output of the pressure difference error compensation means 15.

Figure 8:
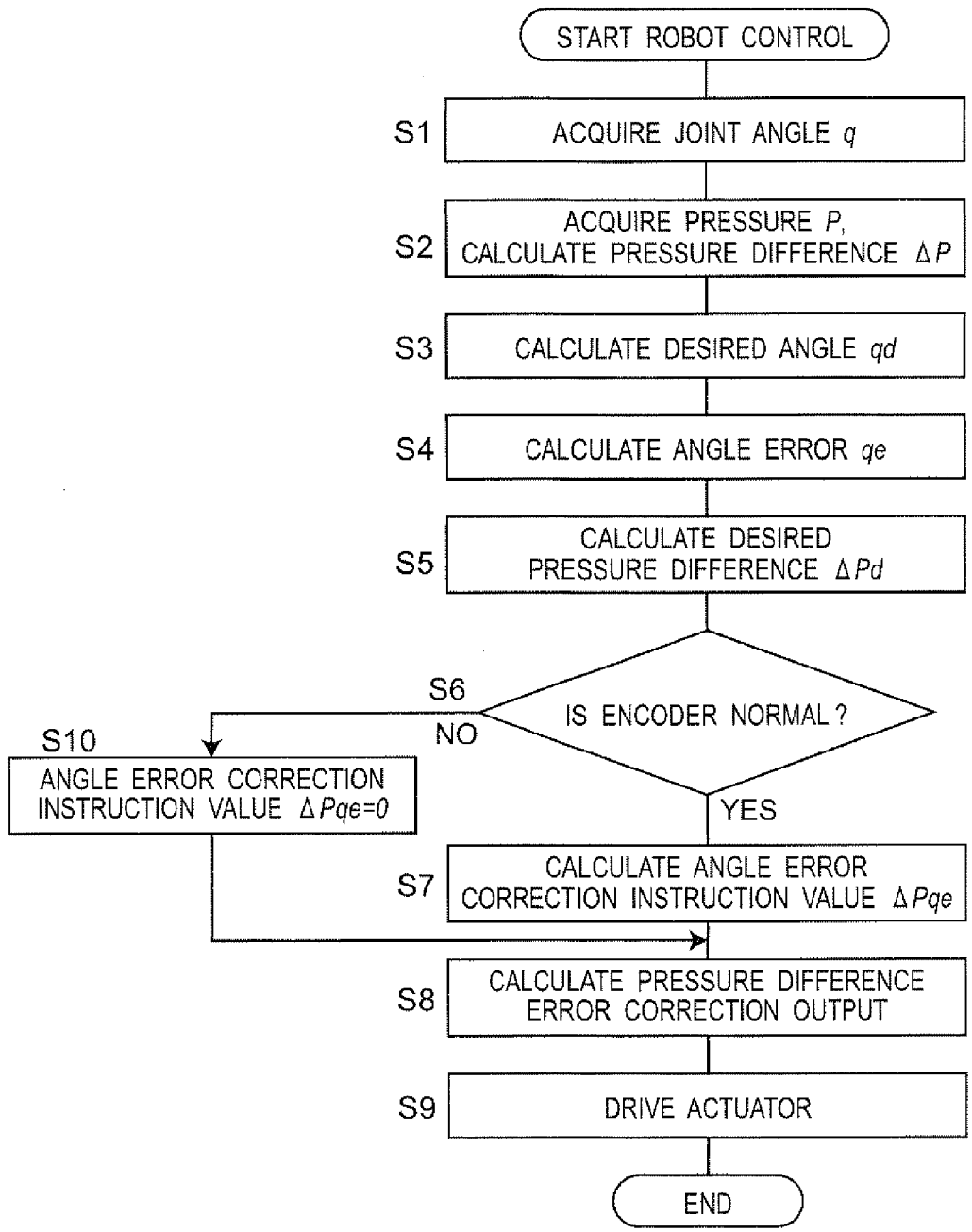
FIG. 8 is a flowchart of operation steps of the control program for the control apparatus of the elastic actuator drive mechanism in the first embodiment of the present invention.

Actual operation steps of the control program, which is based on the above principle, are described based on a flowchart of FIG. 8.

In step S1, the joint angle q of each of the joints 6, which is measured by the encoder 8, is read into the control apparatus 21-1.

Subsequently, in step S2, the internal pressure value P of each actuator 100, which is measured by the pressure sensor 9, is read into the control apparatus 21-1, and the present pressure difference $\Delta P$ between the internal pressures of two actuators 100 and 100 driven to be antagonistic to each other is calculated by the pressure difference calculation means 13.

Subsequently, in step S3, based on the operation program for the elastic actuator drive mechanism 10, which is previously stored in the desired trajectory generation means 11, the desired trajectory generation means 11 calculates the desired joint angle vector $q_d$ of the elastic actuator drive mechanism 10.

Subsequently, in step S4, the angle error vector $q_e$ as the difference between the desired joint angle vector $q_d$, which is outputted from the desired trajectory generation means 11, and the present joint angle q as the output from the encoder 8 is calculated by the output error calculation part 107.

Subsequently, in step S5, the desired pressure difference calculation means 14 calculates the desired pressure difference $\Delta P_d$ based on the desired joint angle vector $q_d$ outputted from the desired trajectory generation means 11.

Subsequently, in step S6, the encoder failure diagnosis means 23 determines whether or not the encoder 8 is normal based on the output (desired joint angle vector) $q_d$ of the desired trajectory generation means 11, the output (joint angle vector) q of the encoder 8, and the output $\Delta P$ from the pressure difference calculation means 13. In the case where the encoder failure diagnosis means 23 determines that the encoder 8 is not normal, the abnormality notification signal is outputted from the encoder failure diagnosis means 23 to the angle error compensation means 12. In the case where the encoder failure diagnosis means 23 determines that the encoder 8 is normal, the abnormality notification signal is not outputted from the encoder failure diagnosis means 23 to the angle error compensation means 12.

A description is made below of the case where the encoder failure diagnosis means 23 determines that the encoder 8 is normal in step S6.

Subsequently to step S6, in step S7, the angle error correction instruction value $\Delta P_{qe}$ is calculated by the angle error compensation means 12 based on the angle error vector $q_e$ calculated by the output error calculation part 107. As the angle error compensation means 12, for example, a PID compensator may be considered.

Subsequently, in step S8, the pressure difference error (pressure error value) $\Delta P_e$ is calculated by the internal state error calculation part 109 based on the angle error correction instruction value $\Delta P_{qe}$ from the angle error compensation means 12, the desired pressure difference $\Delta P_d$ from the desired pressure difference calculation means 14, and the pressure difference $\Delta P$ from the pressure difference calculation means 13. Then, the pressure difference error correction output $V_{\Delta pe}$ is calculated in the pressure difference error compensation means 15 based on the pressure difference error (pressure error value) $\Delta P_e$ calculated by the internal state error calculation part 109. Then, the pressure difference error correction output $V_{\Delta pe}$ is given as the voltage instruction value from the pressure difference error compensation means 15 through the input/output IF 20 such as the P/A board to each of the flow rate control electromagnetic valves 18, and each of the flow rate control electromagnetic valves 18 changes the pressure in each of the actuators 100, whereby the rotation motion of each of the joints 6 of the elastic actuator drive mechanism 10 is generated.

Step S1 to step S8 described above are repeatedly executed as a calculation loop of the control, whereby the control for the operation of the elastic actuator drive mechanism 10 in the case where the encoders 8 operate normally is realized.

A description is made below of the case where the encoder failure diagnosis means 23 determines that each of the encoders 8 is not normal (in other words, is abnormal) in step S6.

Subsequently to step S6, in step S10, based on the abnormality notification signal from the encoder failure diagnosis means 23, the angle error correction instruction value $\Delta P_q=0$ is outputted from the angle error compensation means 12.

Subsequently, in step S8, since the angle error correction instruction value $\Delta P_{qe}$ from the angle error correction means 12 is equal to zero ($\Delta P_{qe}=0$), the pressure difference error (pressure difference value) $\Delta P_e$ is calculated by the internal state error calculation part 109 based on the desired pressure difference $\Delta P_d$ from the desired pressure difference calculation means 14 and the pressure difference $\Delta P$ from the pressure difference calculation means 13. Then, based on the pressure difference error (pressure difference value) $\Delta P_e$ calculated by the internal state error calculation part 109, the pressure difference error correction output $V_{\Delta pe}$ is calculated in the pressure difference error compensation means 15. Then, the pressure difference error correction output $V_{\Delta pe}$ is given as the voltage instruction value from the pressure difference error compensation means 15 through the input/output IF 20 such as the D/A board to each of the flow rate control electromagnetic valves 18, and each of the flow rate control electromagnetic valves 18 changes the pressure in each of the actuators 100, whereby the rotation motion of each of the joints 6 of the elastic actuator drive mechanism 10 is generated.

Step S1 to step S6, step S10, and step S8 described above are repeatedly executed as a calculation loop of the control, whereby the control for the operation of the elastic actuator drive mechanism 10 in the case where the encoders 8 do not operate normally is realized.

A description is made of an operation principle that the elastic actuator drive mechanism 10 is operable when the encoders have failed.

FIG. 7 is a graph of an example showing a relationship between the pressure difference $\Delta P$ and the joint angle of the joint shaft in the elastic actuator 100 shown in FIG. 1, this example being previously stored as an example of an equation in the desired pressure difference calculation means 14. The output of the desired pressure difference calculation means 14, which is obtained by using the relationship shown in FIG. 7, and the output of the pressure difference error compensation means 15 are added to the output of the angle error compensation means 12 that performs feedback control for the output, whereby it is possible to improve responsiveness in comparison with the case of only the feedback control for the output.

As described above, the desired pressure difference calculation means 14 and the pressure difference error compensation means 15 are used for improving the responsiveness of the control system when the encoders 8 are normal. However, at the same time, the relationship between the pressure difference $\Delta P_d$ and the joint angle shown in FIG. 7 is used, whereby the desired pressure difference $\Delta P_d$ for realizing the desired joint angle vector $q_d$ is determined once the desired joint angle vector $q_d$ is determined, and accordingly, at the time when the encoders 8 have failed, it becomes possible to position the elastic actuator 100 to some extent even if there is no effect of the feedback control by the angle error compensation means 12.

As described above, the control apparatus 21-1 of the first embodiment includes the pressure sensor 9, the desired pressure difference calculation means 14, and the pressure difference error compensation means 15, and configure the internal pressure control system that performs feedback of the internal state of the elastic actuator drive mechanism 10. Moreover, the encoder failure diagnosis means 23 is provided to diagnose whether or not the encoders 8 are normal. When it is diagnosed that each encoder 8 is not normal, the encoder failure diagnosis means 23 stops the output of the angle error compensation means 12, and the drive device 102 is driven based on an encoder failure-time instruction value (encoder abnormality-time instruction value, that is, abnormality notification signal) generated by the desired pressure difference calculation means 14 and the pressure difference error compensation means 15. Such a control system to drive the drive device 102 is configured by the control apparatus 21-1, whereby it becomes possible to safely control the elastic actuator drive mechanism 10, which is capable of a continuous operation without instantaneously stopping the operation even in the case where each encoder 8 has failed, without previously preparing instructed data or providing a sensor capable of computing an alternative signal. By the fact that it becomes possible to safely control the elastic actuator drive mechanism 10 capable of the continuous operation without instantaneously stopping the operation even in the case where each encoder 8 has failed, it becomes possible to further exert effects thereof in a drive mechanism that transports an object as shown in FIG. 20. In the case of transporting the transport object 30, if the encoder 8 has failed in the state of grasping the transport object 30 and then the operation is instantaneously stopped, the transport object 30 is sometimes stopped in the air while being left grasped by the hand 31. However, in accordance with the control apparatus 21-1 of the first embodiment, although position control accuracy thereof is not high, the elastic actuator drive mechanism 10 is capable of making the positioning to some extent and capable of the continuous operation. Accordingly, at least the object being transported (for example, a heavy cargo or a person) can be transported from the air to the vicinity of a predetermined desired place (for example, a ground surface or a floor). In this manner, safer control is made possible in the drive mechanism that carries an object.

Second Embodiment

Figure 9:
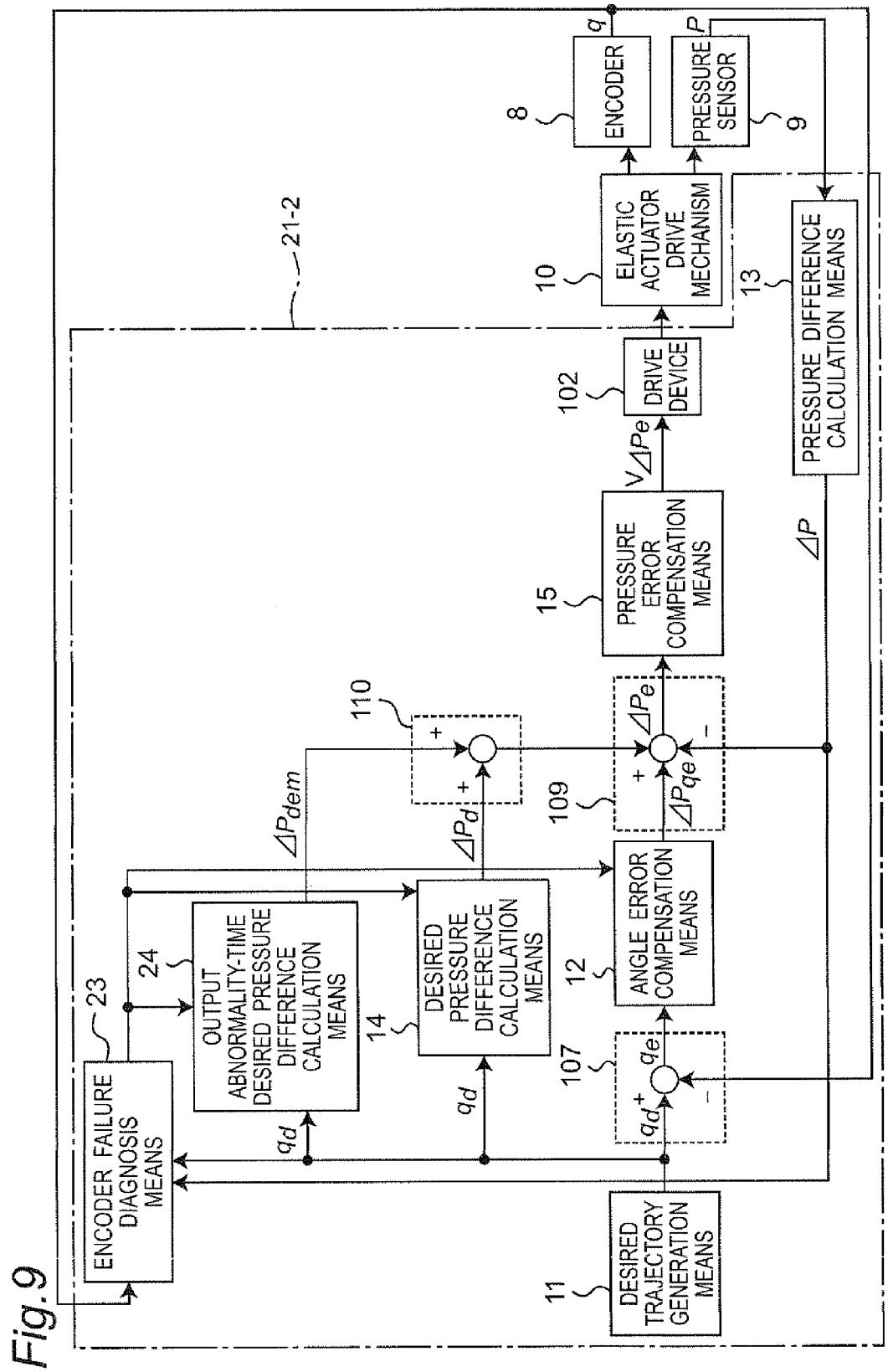
FIG. 9 is a control block diagram of an elastic actuator control apparatus and the like in a second embodiment of the present invention.

FIG. 9 is a view showing a specific configuration of a control apparatus 21-2 of an elastic actuator drive mechanism 10 according to a second embodiment of the present invention. The control apparatus 21-2 is provided, for example, in the control computer 19, and includes: a desired trajectory generation means (unit) 11; a desired pressure difference calculation means (unit) 14; an angle error compensation means (unit) 12; a pressure difference calculation means (unit) 13; a pressure difference error compensation means (unit) 15; an output error calculation part 107; an internal state error calculation part 109; an encoder failure diagnosis means (unit) 23; an output abnormal-time desired pressure difference calculation means (unit) 24; a desired internal state addition means (unit) 110; and a drive device 102.

The desired pressure difference calculation means 14 as an example of a first desired internal state decision means (unit) receives the desired joint angle vector $q_d$ and the abnormality notification signal coming from the encoder failure diagnosis means 23. When there is no input from the encoder failure diagnosis means 23, the desired pressure difference (desired value of the pressure difference) $\Delta P_d = [\Delta P_{1d}, \Delta P_{2d}]^T$ is calculated from the desired joint angle vector $q_d$, and is outputted toward the desired internal state addition means 110. Note that $\Delta P_{1d}$ and $\Delta P_{2d}$ are a desired value of the pressure difference between the elastic expansion/contraction structures 1-1a and 1-1b, and a desired value of the pressure difference between the elastic expansion/contraction structures 1-2a and 1-2b, respectively. When there is an input of the abnormality notification signal from the encoder failure diagnosis means 23, such desired pressure differences $\Delta P_d$ are not outputted ($\Delta P_d$ are set equal to zero (0)) regardless of the value of the desired joint angle vector $q_d$.

The output abnormality-time desired pressure difference calculation means 24 as an example of a second desired internal state decision means (unit) (abnormality-time desired internal state decision means (unit)) receives the desired joint angle vector $q_d$ from the desired trajectory generation means 11 and the abnormality notification signal coming from the encoder failure diagnosis means 23, and calculates and outputs the desired pressure difference $\Delta P$. Hence, the desired pressure difference calculation means 14 functions as a normality-time desired pressure difference calculation means (unit) (example of a normality-time desired internal state decision means (unit)).

When no abnormality notification signal is inputted from the encoder failure diagnosis means 23 to the output abnormality-time desired pressure difference calculation means 24, the output abnormality-time desired pressure difference calculation means 24 does not output the desired pressure difference $\Delta P$ ($\Delta P$ is set equal to zero (0)). When the abnormality notification signal is inputted from the encoder failure diagnosis means 23 to the output abnormality-time desired pressure difference calculation means 24, the output abnormality-time desired pressure difference calculation means 24 calculates the desired pressure difference (desired value of the pressure difference) $\Delta P_d = [\Delta P_{1d}, \Delta P_{2d}]^T$ from the desired joint angle vector $q_d$, and outputs the desired pressure difference to the desired internal state addition means 110.

Figure 10:
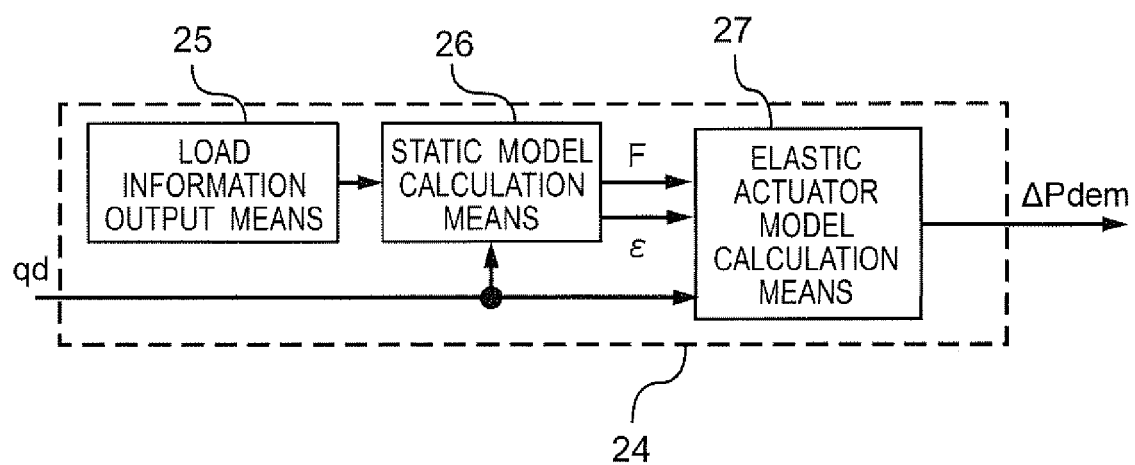
FIG. 10 is a control block diagram showing details of a desired pressure difference calculation means when an output is abnormal in the second embodiment of the present invention.

Here, FIG. 10 is a more detailed view showing an example of the output abnormality-time desired pressure difference calculation means (unit) 24 (output desired pressure difference calculation means (unit)). The output abnormality-time desired pressure difference calculation means 24 includes a load information output means 25, a static model calculation means 26, and an elastic actuator model calculation means 27.

Figure 11:
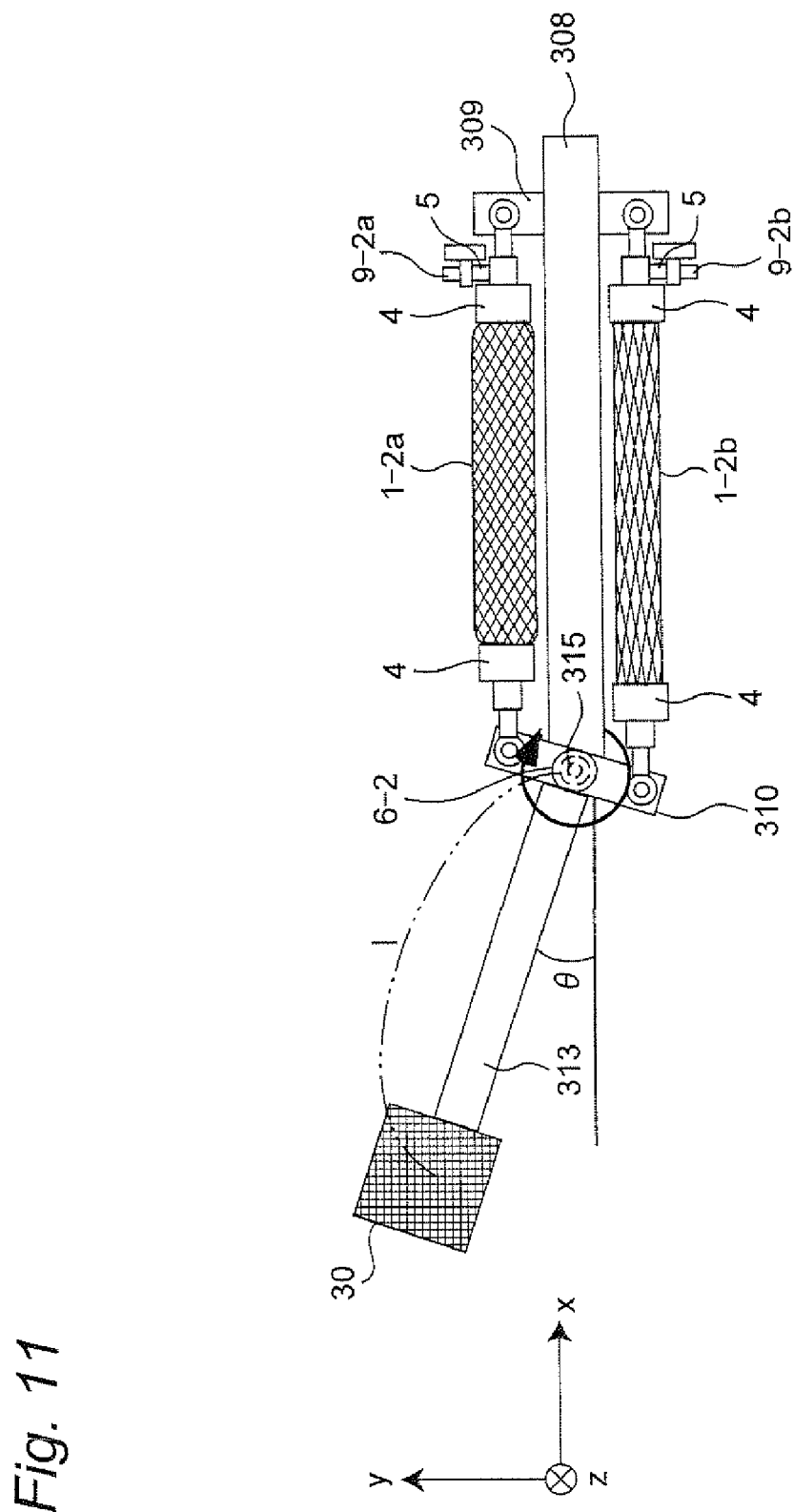
FIG. 11 is a view showing a state where the drive mechanism of the elastic actuator grasps an object in the second embodiment of the present invention.

The load information output means 25 outputs load information regarding the drive member 313 of the elastic actuator drive mechanism 10 to the static model calculation means 26. For example, a weight and the like of an object in the case where the object is attached onto a tip end of the drive member 313 correspond to the load information. FIG. 11 shows a tip end portion of the elastic actuator drive mechanism 10 in the case where the transport object 30 as an example of the object is attached onto the tip end of the drive member 313 (for example, in the case where the transport object 30 is grasped by the hand or the like at the tip end of the drive member 313). In the example shown in FIG. 11, a weight of the transport object is the load.

The static model calculation means 26 receives the load information as an output of the load information output means 25 and the desired joint angle vector $q_d$ as the output of the desired trajectory generation means 11. Then, the static model calculation means 26 outputs a force output vector $F = [F_{1a} - F_{1b}, F_{2a} - F_{2b}]^T$, which is required for the elastic expansion/contraction structures 1, and a strain amount vector $\in = [\in_{1a}, \in_{1b}, \in_{2a}, \in_{2b}]^T$, which is required for the elastic expansion/contraction structures 1, to the elastic actuator model calculation means 27. Note that $F_{1a}$, $F_{1b}$, $F_{2a}$, and $F_{2b}$ are forces, which are required for the elastic expansion/contraction structures 1-1a, 1-1b, 1-2a, and 1-2b, respectively, and $\in_{1a}$, $\in_{1b}$, $\in_{2a}$, and $\in_{2b}$ are strain amounts, which are required for the elastic expansion/contraction structures 1-1a, 1-1b, 1-2a, and 1-2b, respectively.

The elastic actuator model calculation means 27 receives the force output vector F and the strain amount vector $\in$, which are outputs of the static model calculation means 26, and the desired joint angle vector $q_d$ that is an output of the desired trajectory generation means 11, calculates a desired pressure difference (desired value of the pressure difference) $\Delta P_{dem} = [\Delta P_{1dem}, \Delta P_{2dem}]^T$, and outputs the calculated desired pressure difference $\Delta P_{dem}$ to the desired internal state addition means 110.

By using the example of FIG. 11, the output abnormality-time desired pressure difference calculation means 24 is described more specifically. A gravitational acceleration is defined as g, and a gravitational acceleration direction is defined as a −y direction of FIG. 11 (downward direction of FIG. 11). A right direction of the x-axis in FIG. 11 is defined to be positive, an upward direction of the y-axis in FIG. 11 is defined to be positive, and a far side of the z-axis in a direction penetrating a sheet surface of FIG. 11 is defined to be positive.

The load information output means 25 calculates load information mg from a previously stored mass m of the transport object 30, and outputs the load information mg to the static model calculation means 26.

The static model calculation means 26 calculates necessary torque of the joint shaft 6-2 based on the load information mg inputted thereto from the load information output means 25 and the desired joint angle vector $q_d$ as the output of the desired trajectory generation means 11. In the example of FIG. 11, $q_{d2}$ is equal to $\theta$ ($g_{d2}=\theta$), l is a length from a gravitational center of the transport object 30 along a longitudinal direction of the drive member 313 to a rotation center of the second joint shaft 6-2, $\theta$ is an inclination angle of the longitudinal direction of the drive member 313 with respect to the horizontal axis, and the necessary torque $\tau_2$ is obtained from the following Equation 1.

$$\tau_2 = -mgl \cdot \cos \theta \quad \text{[Equation 1]}$$

Here, the following Equation 2 is established.

$$\tau_2 = l_2 \cdot \cos \theta \cdot (F_{2b} - F_{2a}) \quad \text{[Equation 2]}$$

Therefore, force required for each of the elastic expansion/contraction structures 1, which is necessary to generate the torque $\tau_2$, is obtained by the following Equation 3.

$$F_{2a} - F_{2b} = mgl/l_2 \quad \text{[Equation 3]}$$

Figure 12:
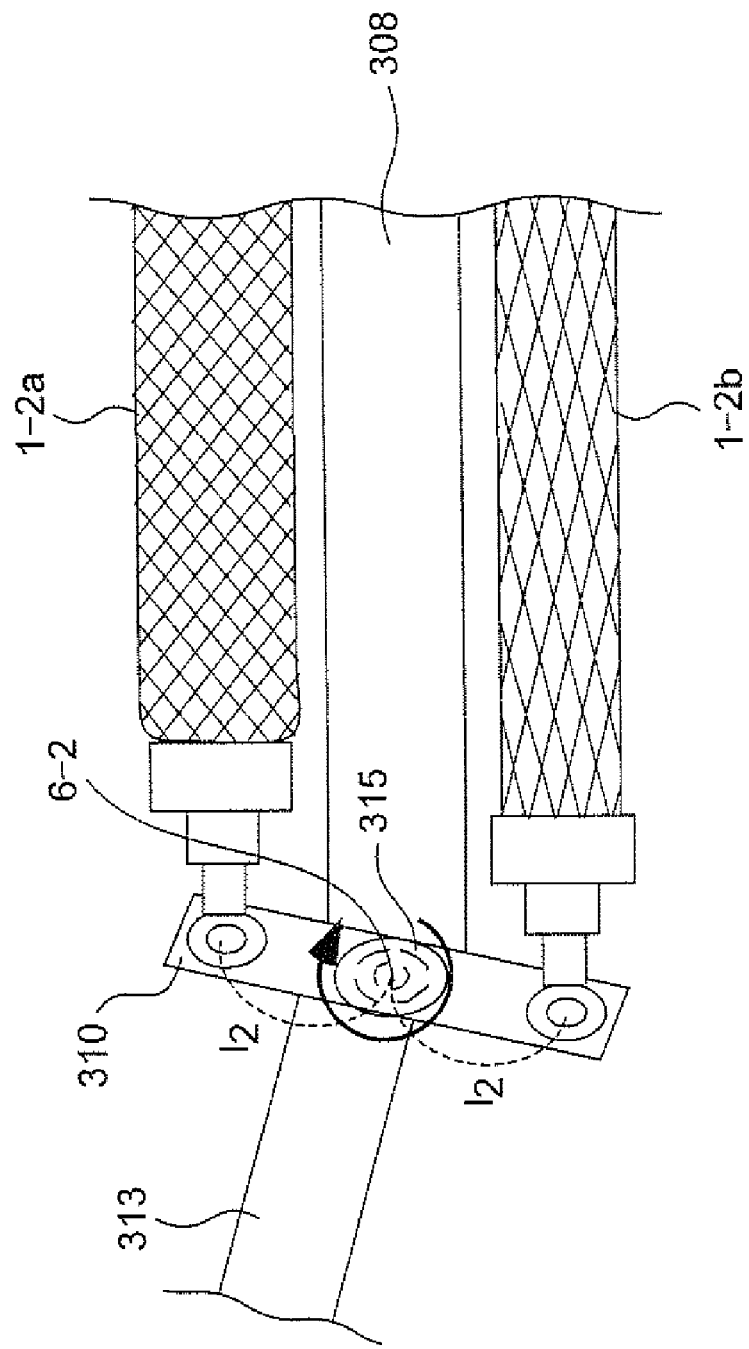
FIG. 12 is a view showing details of the state where the drive mechanism of the elastic actuator grasps the object in the second embodiment of the present invention.

Here, $l_2$ is a distance between the rotation center of the second joint shaft 6-2 and a coupling portion to which the end portion of the elastic expansion/contraction structure 1-2a (1-2b) is freely rotatably coupled to the support body 310 along the longitudinal direction of the support body 310 perpendicularly intersecting the longitudinal direction of the drive member 313 (refer to FIG. 12).

Moreover, the static model calculation means 26 calculates a strain amount, which is required for each of the elastic expansion/contraction structures 1, based on the desired joint angle vector $q_d$. The stain amount $q_{d2}$ is equal to $\theta$ ($q_{d2}=\theta$), and accordingly, the following Equation 4 is established.

$$\in_{2a} = \in_2 + l_2 \cdot \sin \theta / N_2$$

$$\in_{2b} = \in_2 - l_2 \cdot \sin \theta / N_2$$

Note that $\in_2$ is a strain amount of the elastic expansion/contraction structure 1-2a or 1-2b in a state where the second joint shaft 6-2 is neutral, and $N_2$ is a natural length of the elastic expansion/contraction structure 1-2a or 1-2b.

These force $F_{2a}$-$F_{2b}$ and strain amounts $\in_{2a}$ and $\in_{2b}$ are outputted from the static model calculation means 26 to the elastic actuator model calculation means 27.

The elastic actuator model calculation means 27 receives the force output vector F and the strain amount vector $\in$ from the static model calculation means 26, and calculates and outputs the desired pressure difference (desired value of the pressure difference) $\Delta P_{dem} = [\Delta P_{1d}, \Delta P_{2d}]^T$.

Figure 13:
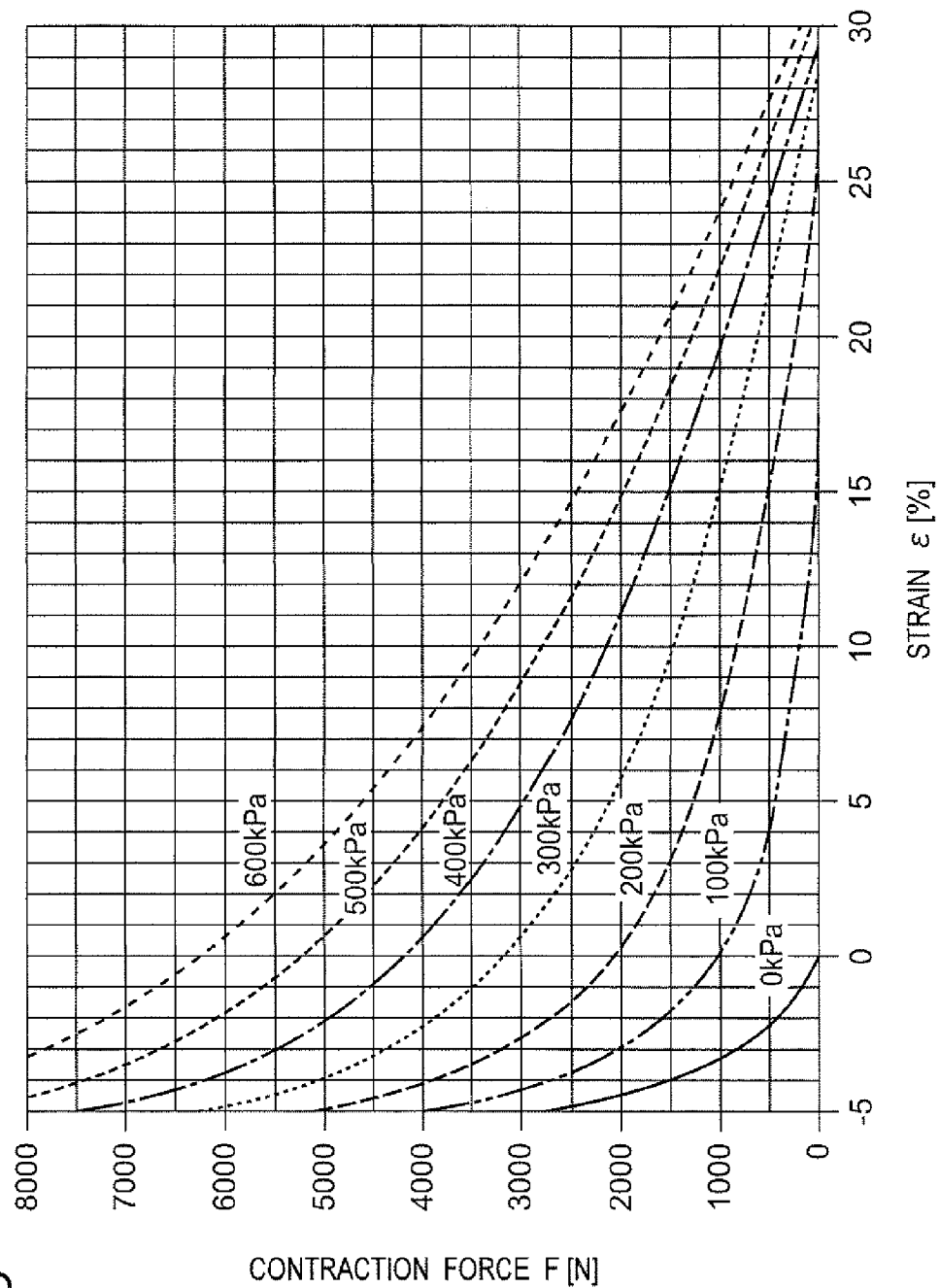
FIG. 13 is a view showing a part of an elastic actuator model calculation means in the second embodiment of the present invention.
Figure 14:
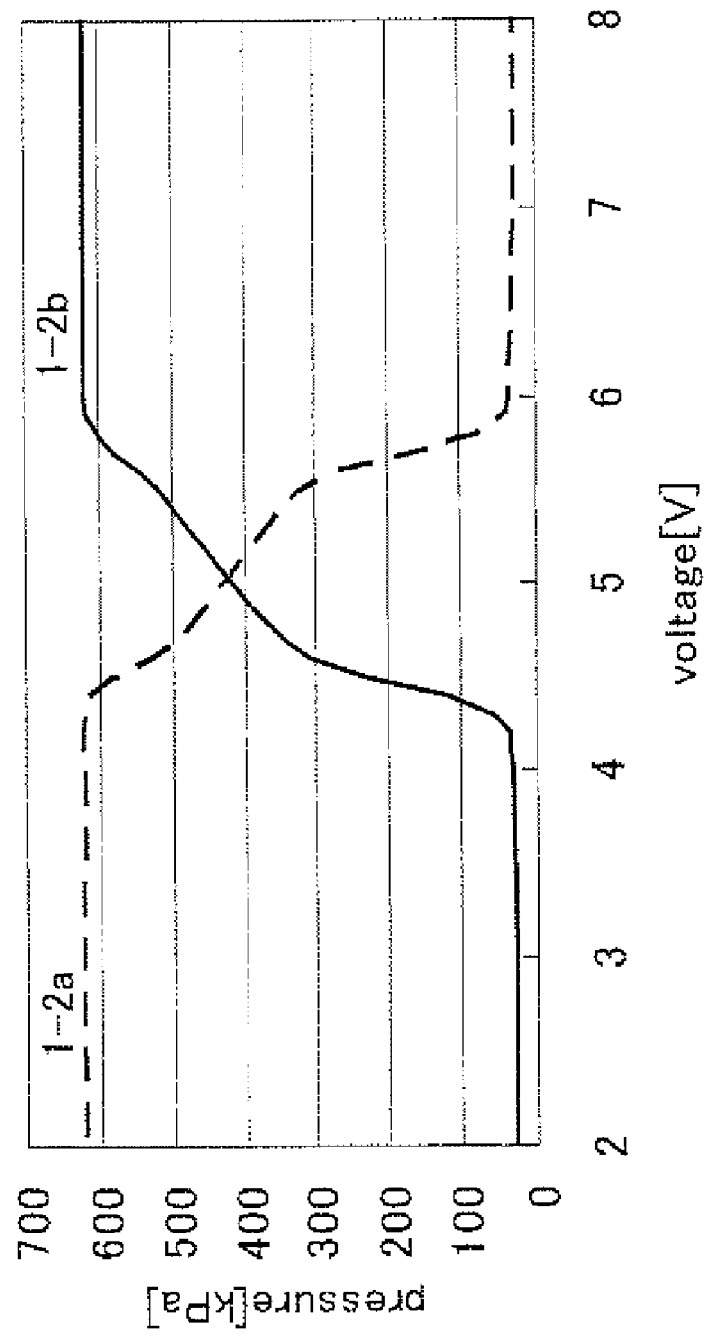
FIG. 14 is a view showing a part of an elastic actuator model calculation means in the second embodiment of the present invention.

FIG. 13 and FIG. 14 are views showing an example of the elastic actuator model calculation means (unit) 27. FIG. 13 is a view showing a relationship among the strain amount, a contraction rate, and the pressure in the respective elastic expansion/contraction structures 1-2a and 1-2b, and FIG. 14 is a view showing the instruction voltage of the five-port flow rate control electromagnetic valve 18 and the pressures in a pair of the elastic expansion/contraction structures 1-2a and 1-2b when using the five-port flow rate control electromagnetic valve 18. Based on such relationships, the elastic actuator model calculation means 27 calculates and outputs the desired pressure difference (desired value of the pressure difference) $\Delta P_{dem}$.

Figure 15:
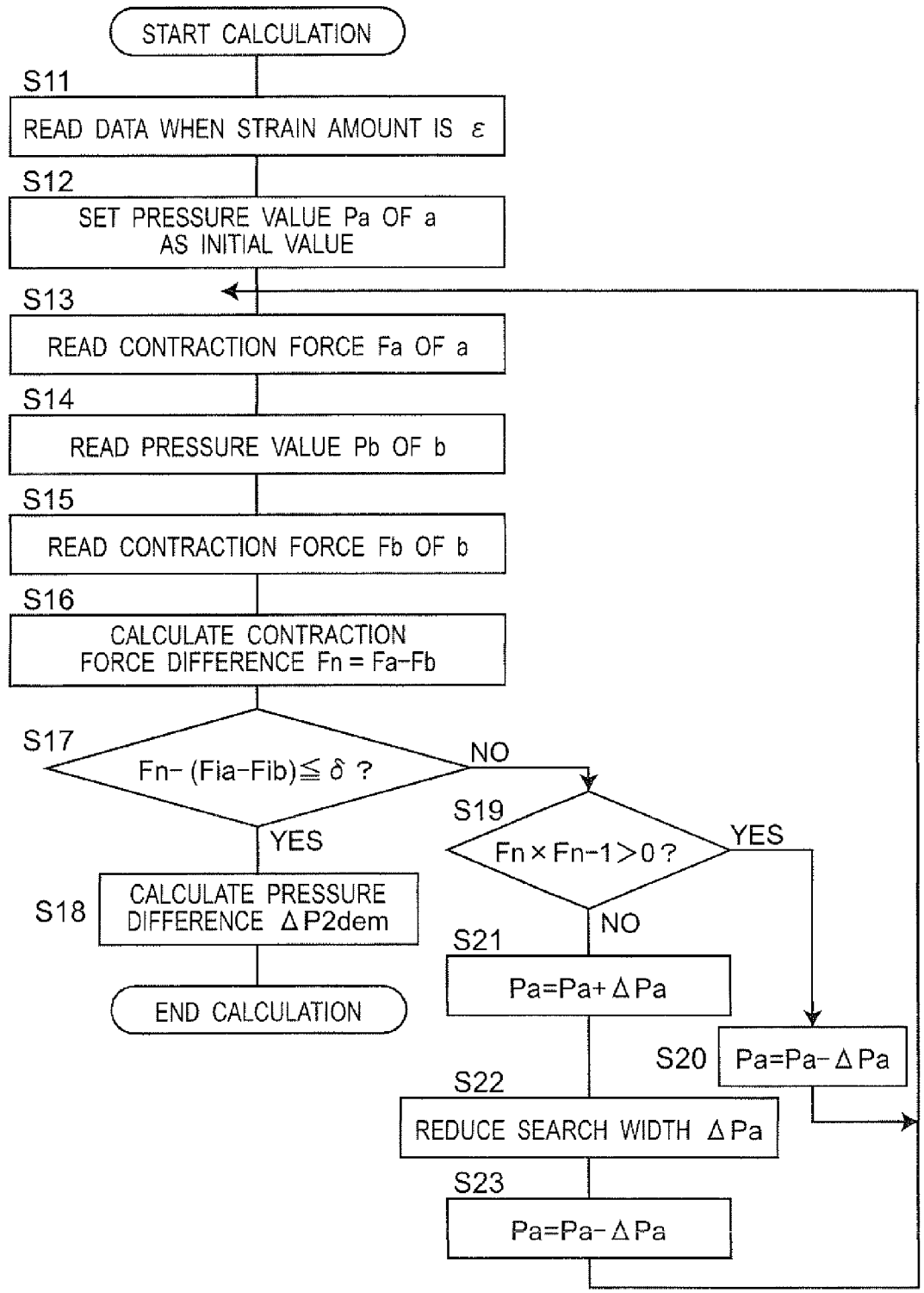
FIG. 15 is a flowchart of operation steps of a calculation program of an output abnormal-time desired pressure difference calculation means in the second embodiment of the present invention.

Actual operation steps of the elastic actuator model calculation means 27 are described based on a flowchart of FIG. 15. In FIG. 15, for the sake of simplification, one of the elastic expansion/contraction structures 1 which make a pair is displayed as "a", and the other elastic expansion/contraction structure 1 is displayed as "b".

In step S11, based on the strain amount vector inputted from the static model calculation means 26, the relational data between the pressure and the contraction force in each of the elastic expansion/contraction structures 1, which is previously stored in a storage means of the elastic actuator model calculation means 27, is read from the storage means of the elastic actuator model calculation means 27 into a computing processing means thereof.

Subsequently, in step S12, the pressure value $P_a$ of one of the elastic expansion/contraction structures 1 which make a pair is set at an initial value. The initial value of the pressure is set at a value of an upper end of a range that can be covered by the pressure.

Subsequently, in step S13, from the data read from the storage means of the elastic actuator model calculation means 27 into the computing processing means thereof in step S11, the contraction force $F_a$ of one of the elastic expansion/contraction structures 1, which corresponds to the pressure value decided in step S12, is read by the computing processing means.

Subsequently, in step S14, based on a relationship between the pressures of the elastic expansion/contraction structures 1 and the voltage of the five-port flow rate control electromagnetic valve 18, which is shown in FIG. 14, the pressure value $P_b$ of the other elastic expansion/contraction structure 1 that makes a pair with one of the elastic expansion/contraction structures 1, for which the pressure is decided in step S12, is read into the computing processing means.

Subsequently, in step S15, from the data read in step S11, the contraction force $F_b$ of the other elastic expansion/contraction structure 1, which corresponds to the pressure value decided in step S14, is read by the computing processing means.

Subsequently, in step S16, in the computing processing means of the elastic actuator model calculation means 27, a contraction force error $F_n = (F_a - F_b) (F_{ia} - F_{ib})$ which is a difference between $(F_a - F_b)$ as a difference of a difference between the contraction force $F_a$ decided in step S13 and the contraction force $F_b$ decided in step S15 and $(F_{ia} - F_{ib})$ is calculated. Here, $F_{ia}$ and $F_{ib}$ are elements of the inputted force output vector F, and the difference therebetween is represented in the following Equation 5.

$$F_{ia} - F_{ib} (i=1,2) \quad \text{[Equation 5]}$$

Here, n is the number of repetition times (n is an integer larger than 1 ($n \geq 1$)).

Subsequently, in step S17, in the computing processing means of the elastic actuator model calculation means 27, it is determined whether or not the contraction force error $F_n$ is a predetermined threshold value $\delta$ or less. When the contraction force error $F_n$ is the threshold value $\delta$ or less, it is regarded that the desired pressures $P_a$ and $P_b$ which can realize the desired contraction force difference can be searched.

A description is made below of the case where it is determined by the computing processing means of the elastic actuator model calculation means 27 that the contraction force error $F_n$ is the threshold value $\delta$ or less in step S17.

Subsequently to step S17, in step S18, the computing processing means of the elastic actuator model calculation means 27 calculates the pressure difference $\Delta P_{2dem} = P_a - P_b$. For example, the pressure difference $\Delta P_{2dem}$ is calculated to be equal to 150 kPa (=500−350). The calculation of the pressure difference $\Delta P_{2dem}$ is ended as above.

A description is made below of the case where it is determined by the computing processing means of the elastic actuator model calculation means 27 that the contraction force error $F_n$ is larger than the threshold value $\delta$ in step S17.

Subsequently to step S17, in step S19, it is determined, by the computing processing means of the elastic actuator model calculation means 27 whether or not signs (positive and negative) of the contraction force error $F_n$ at this time and a contraction force error $F_{n-1}$ at the previous time coincide with each other. In the case where the signs at this time and the previous time do not coincide with each other, it is understood that a pressure value between the pressure value at the previous time and the pressure value at this time is a pressure value to be obtained. However, in the case where this time is the first time $F_1$, the contraction force error at the previous time does not exist, and the pressure values are treated on the assumption that the signs coincide with each other.

A description is made below of the case where it is determined by the computing processing means of the elastic actuator model calculation means 27 that the signs of the contraction force error $F_n$ at this time and the contraction force error $F_{n-1}$ at the previous time coincide with each other in step S19.

Subsequently to step S19, in step S20, the pressure value $P_a$ of one of the elastic expansion/contraction structures 1 is reset in the computing processing means. The pressure value $P_a$ is searched while being gradually reduced from the initial value. Accordingly, a value obtained by subtracting a preset search width $\Delta P_a$ from the present pressure value $P_a$ is set as a next pressure value $P_a$. With the new pressure value $P_a$, the operation returns to step S13, and a repetition search is performed in step S13 and subsequent steps.

A description is made below of the case where it is determined by the computing processing means of the elastic actuator model calculation means 27 that the signs of the contraction force error $F_n$ at this time and the contraction force error $F_{n-1}$ at the previous time do not coincide with each other in step S19. In the case where the signs do not coincide with each other, it is understood that there is a pressure value, which is desired to be obtained, between the pressure value at the previous time and the pressure value at this time. Accordingly, the search width $\Delta P_a$ is finely set, and another search is performed from the previous pressure value by the computing processing means.

Subsequently to step S19, in step S21, by the computing processing means, the pressure value $P_a$ of one of the elastic expansion/contraction structures 1 is reset to the pressure value at the previous time. With the way of setting, the search width $\Delta P_a$ is added to the pressure value $P_a$, whereby the pressure value can be reset to the pressure value at the previous time by the computing processing means.

Subsequently, in step S22, by the computing processing means, the search width $\Delta P_a$ is reset to be small. With regard to the way of reducing the search width $\Delta P_a$, reduction widths of the search width. $\Delta P_a$ are stored in advance in the elastic actuator model calculation means 27, such as 50 in the beginning, next 20, and then 1.

Subsequently, in step S23, by the computing processing means, the pressure value $P_a$ of one of the elastic expansion/contraction structures 1 is reset by using the new search width $\Delta P_a$. A value obtained by subtracting, from the present pressure value $P_a$, the search width $\Delta P_a$ which is reset in step S22 is set as a next pressure value $P_a$ by the computing processing means. With the new pressure value $P_a$, the operation returns to step S13, and the repetition search is performed in step S13 and subsequent steps.

Step S11 to step S23 described above are repeatedly executed, whereby, in the elastic actuator model calculation means 27, the calculation of the pressure difference required for the elastic expansion/contraction structures 1 is realized based on the strain amount vector and the force output vector, which are inputted from the static model calculation means 26.

The calculation of the pressure difference is performed for each of the joint shafts 6-1 and 6-2, and the desired pressure difference $\Delta P_{dem} = [\Delta P_{1d}, \Delta P_{2d}]^T$ is calculated by the elastic actuator model calculation means 27. The elastic actuator model calculation means 27 outputs the calculated desired pressure difference $\Delta P_{dem}$ to the desired internal state addition means 110.

The desired internal state addition means 110 adds the desired pressure difference $\Delta P_d$ as the output from the desired pressure difference calculation means 14 and the desired pressure difference $\Delta P_{dem}$ as the output from the output abnormality-time desired pressure difference calculation means 24 to each other to calculate the desired pressure difference, and outputs the calculated desired pressure difference to the internal state error calculation part 109.

The internal state error calculation part 109 adds the desired pressure difference outputted from the desired internal state addition means 110 and $\Delta P_{qe}$ outputted from the angle error compensation means 12 to each other, and subtracts $\Delta P$ outputted from the pressure difference calculation means 13, from a value obtained by such addition, to thereby calculate the pressure difference error (pressure error value) $\Delta P_e$, and outputs the calculated pressure difference error $\Delta P_e$ to the pressure difference error compensation means 15.

Other configurations are similar to those of the control apparatus 21-1 of the first embodiment, which is shown in FIG. 6, and a description thereof is omitted.

Figure 16:
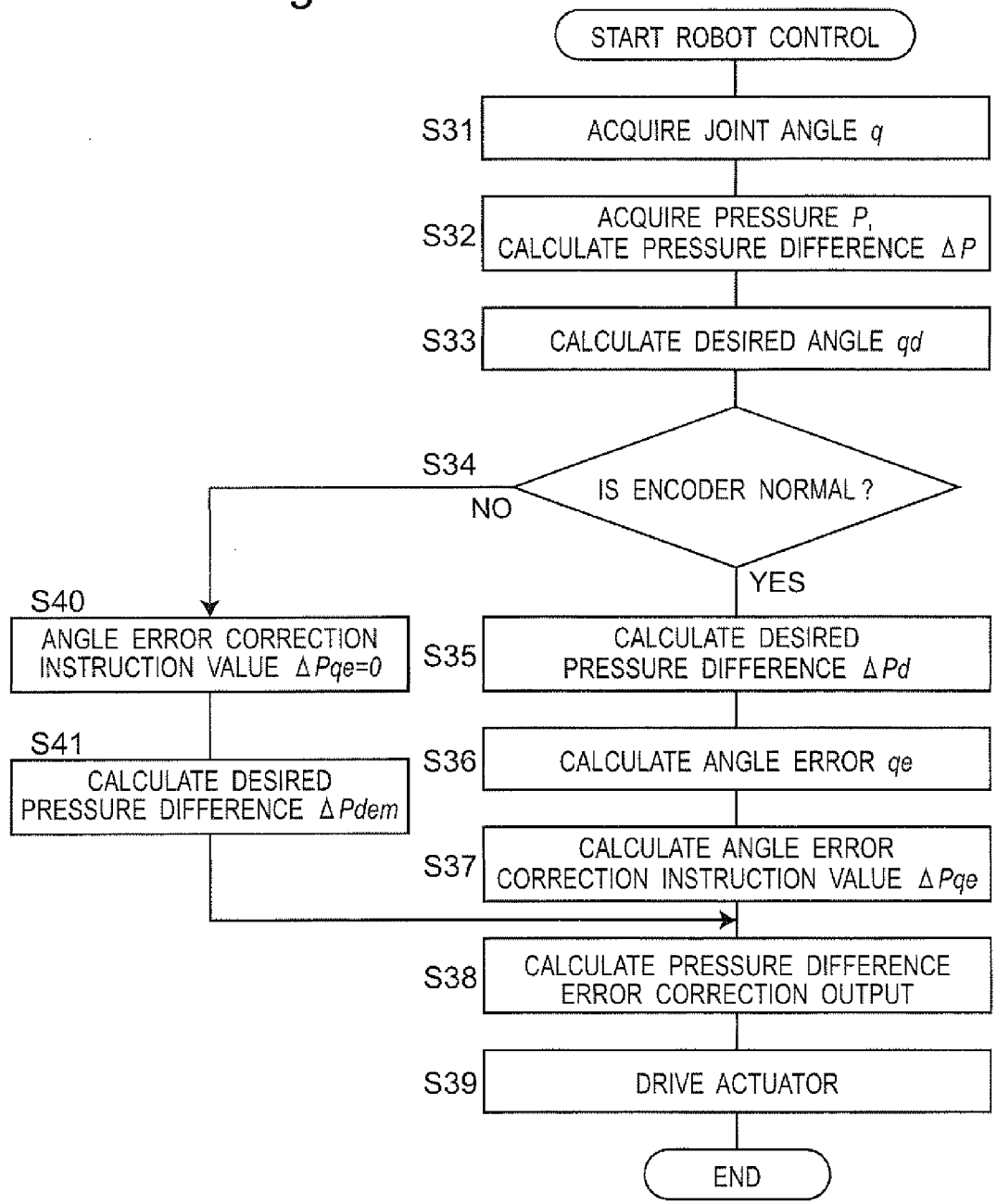
FIG. 16 is a flowchart of operation steps of a control program for a control apparatus of the elastic actuator drive mechanism in the second embodiment of the present invention.

Actual operation steps of the control program based on the above principle are described based on a flowchart of FIG. 16.

In step S31, the joint angle q measured by the encoder 8 is taken into the control apparatus 21-2.

Subsequently, in step S32, the internal pressure values P of the respective actuators 100, which are measured by the pressure sensor 9, are taken into the control apparatus 21-2, and the present pressure difference $\Delta P$ between the internal pressures of two actuators 100 and 100 driven to be antagonistic to each other is calculated by the pressure difference calculation means 13.

Subsequently, in step S33, based on the operation program for the elastic actuator drive mechanism 10, which is previously stored in the desired trajectory generation means 11, the desired trajectory generation means 11 calculates the desired joint angle vector $q_d$ of the elastic actuator drive mechanism 10.

Subsequently, in step S34, based on the output (desired joint angle vector) $q_d$ of the desired trajectory generation means 11, the output (joint angle vector) q of the encoder 8, and the output ΔP from the pressure difference calculation means 13, the encoder failure diagnosis means 23 determines whether or not the encoder 8 is normal. In the case where the encoder failure diagnosis means 23 determines that the encoder 8 is not normal, the abnormality notification signal is outputted from the encoder failure diagnosis means 23 to the angle error compensation means 12, the desired pressure difference calculation means 14, and the output abnormality-time desired pressure difference calculation means 24.

A description is made below of the case where the encoder failure diagnosis means 23 determines that the encoder 8 is normal in step S34.

Subsequently to step S34, in step S35, the abnormality notification signal is not inputted to the desired pressure difference calculation means 14 since the encoder 8 is normal, and accordingly, the desired pressure difference calculation means 14 calculates the desired pressure difference $\Delta P_d$ based on the desired joint angle vector $q_d$ from the desired trajectory generation means 1"

Subsequently, in step S36, the output error calculation part 107 calculates the angle error vector $q_e$ as a difference between the desired joint angle vector $q_d$ from the desired trajectory generation means 11 and the present joint angle q from the encoder 8.

Subsequently, in step S37, the angle error correction instruction value $\Delta P_{qe}$ is calculated by the angle error compensation means 12 based on the angle error vector $q_e$ from the output error calculation part 107. As the angle error compensation means 12, for example, a PID compensator may be considered.

Subsequently, in step S38, since the encoder 8 is normal, the abnormality notification signal is not inputted to the desired pressure difference calculation means 14, the output abnormality-time desired pressure difference calculation means 24, and the output abnormality-time desired pressure difference calculation means 24, and accordingly, the desired pressure difference $\Delta P_d$ as the output from the desired pressure difference calculation means 14 and the desired pressure difference $\Delta P_{dem}$ (=0) as the output from the output abnormality-time desired pressure difference calculation means 24 are added to each other by the desired internal state addition means 110. Then, the desired pressure difference $\Delta P_d$ is thereby calculated, and is outputted to the internal state error calculation part 109. In the internal state error calculation part 109, the pressure difference error (pressure error value) $\Delta P_e$ is calculated thereby based on the angle error correction instruction value $\Delta P_{qe}$ calculated by the angle error compensation means 12, the desired pressure difference $\Delta P_d$ from the desired internal state addition means 110, and the pressure difference ΔP from the pressure difference calculation means 13. Then, based on the pressure difference error (pressure error value) $\Delta P_e$ calculated by the internal state error calculation part 109, the pressure difference error correction output $V_{\Delta pe}$ is calculated in the pressure difference error compensation means 15. Then, the pressure difference error correction output $V_{\Delta pe}$ is given as the voltage instruction value from the pressure difference error compensation means 15 through the input/output IF 20 such as the D/A board to the respective flow rate control electromagnetic valves 18, and the respective flow rate control electromagnetic valves 18 change the pressures in the actuators 100 corresponding thereto. In this manner, the rotation motions of the respective joints 6 of the elastic actuator drive mechanism 10 are generated.

Step S31 to step S39 described above are repeatedly executed as a calculation loop of the control, whereby the control for the operation of the elastic actuator drive mechanism 10 in the case where each of the encoders 8 operates normally is realized.

A description is made below of the case where it is determined by the encoder failure diagnosis means 23 that each of the encoders 8 is not normal in step S34.

Subsequently to step S34, in step S40, $\Delta P_{qe}=0$ is outputted from the angle error compensation means 12 based on the abnormality notification signal inputted from the encoder failure diagnosis means 23 to the angle error compensation means 12.

Subsequently, in step S41, based on the abnormality notification signal inputted from the encoder failure diagnosis means 23 to the output desired pressure difference calculation means 24, the desired pressure difference $\Delta P_{dem}$ as the abnormality-time desired value is calculated by the output desired pressure difference calculation means 24 based on the desired joint angle vector $q_d$ from the desired trajectory generation means 11.

Subsequently, in step S38, since the encoder 8 is not normal, the abnormality notification signal is inputted to the desired pressure difference calculation means 14, the output abnormality-time desired pressure difference calculation means 24, and the output abnormality-time desired pressure difference calculation means 24, and accordingly, the desired pressure difference $\Delta P_d=0$ as the output from the desired pressure difference calculation means 14 and the desired pressure difference $\Delta P_{dem}$ as the output from the output abnormality-time desired pressure difference calculation means 24 are added to each other by the desired internal state addition means 110. Then, the desired pressure difference $\Delta P_d$ is thereby calculated, and is outputted to the internal state error calculation part 109. In the internal state error calculation part 109, the pressure difference error (pressure error value) $\Delta P_e$ is calculated thereby based on the angle error correction instruction value $\Delta P_{qe}=0$ calculated by the angle error compensation means 12, the desired pressure difference $\Delta P_d$ from the desired internal state addition means 110, and the pressure difference ΔP from the pressure difference calculation means 13. Then, based on the pressure difference error (pressure error value) $\Delta P_e$ calculated by the internal state error calculation part 109, the pressure difference error correction output $V_{\Delta pe}$ is calculated in the pressure difference error compensation means 15. Then, the pressure difference error correction output $V_{\Delta pe}$ is given as the voltage instruction value from the pressure difference error compensation means 15 through the input/output IF 20 such as the D/A board to the respective flow rate control electromagnetic valves 18, and the respective flow rate control electromagnetic valves 18 change the pressures in the actuators 100 corresponding thereto. In this manner, the rotation motions of the respective joints 6 of the elastic actuator drive mechanism 10 are generated.

Step S31 to step S34, step S40, step S41, and step S38 described above are repeatedly executed as a calculation loop of the control, whereby the control for the operation of the elastic actuator drive mechanism 10 in the case where each of the encoders 8 does not operate normally is realized.

As described above, in accordance with the control apparatus 21-2 of the second embodiment, the pressure sensor 9, the desired pressure difference calculation means 14, and the pressure difference error compensation means 15 are arranged, and the internal pressure control system that performs feedback of the internal state of the elastic actuator 100 is configured, and moreover, the encoder failure diagnosis means 23 is arranged, whereby whether or not each of the encoders 8 is normal is diagnosed. Hence, when it is diagnosed by the encoder failure diagnosis means 23 that each encoder 8 is not normal, the output of the angle error compensation means 12 is stopped, and further, the output abnormality-time desired pressure difference calculation means 24 is arranged, and when the encoder is abnormal, the drive device 102 is driven based on the desired pressure difference calculation means 24 and the pressure difference error compensation means 15. Such a control system to drive the drive device 102 is configured by the control apparatus 21-2. With such a configuration, it becomes possible to safely control the elastic actuator drive mechanism 10, which is capable of continuously operating the elastic actuator 100 without instantaneously stopping the operation thereof even in the case where each encoder 8 has failed, without preparing the instructed data in advance or providing the sensor capable of computing the alternative signal.

Moreover, in the second embodiment, the output abnormality-time desired pressure difference calculation means 24 is arranged, and a configuration is adopted so as to use the static model of the drive mechanism 10 of the elastic actuator 100, the load information on the drive mechanism 10 of the elastic actuator 100, and the elastic actuator model. With such a configuration, the operation control when the encoder has failed, which cannot be realized in the first embodiment, and corresponds to the change of the state of the drive mechanism 10 of the elastic actuator 100 due to the load of the drive mechanism 10 of the elastic actuator 100, can be performed.

Third Embodiment

Figure 21:
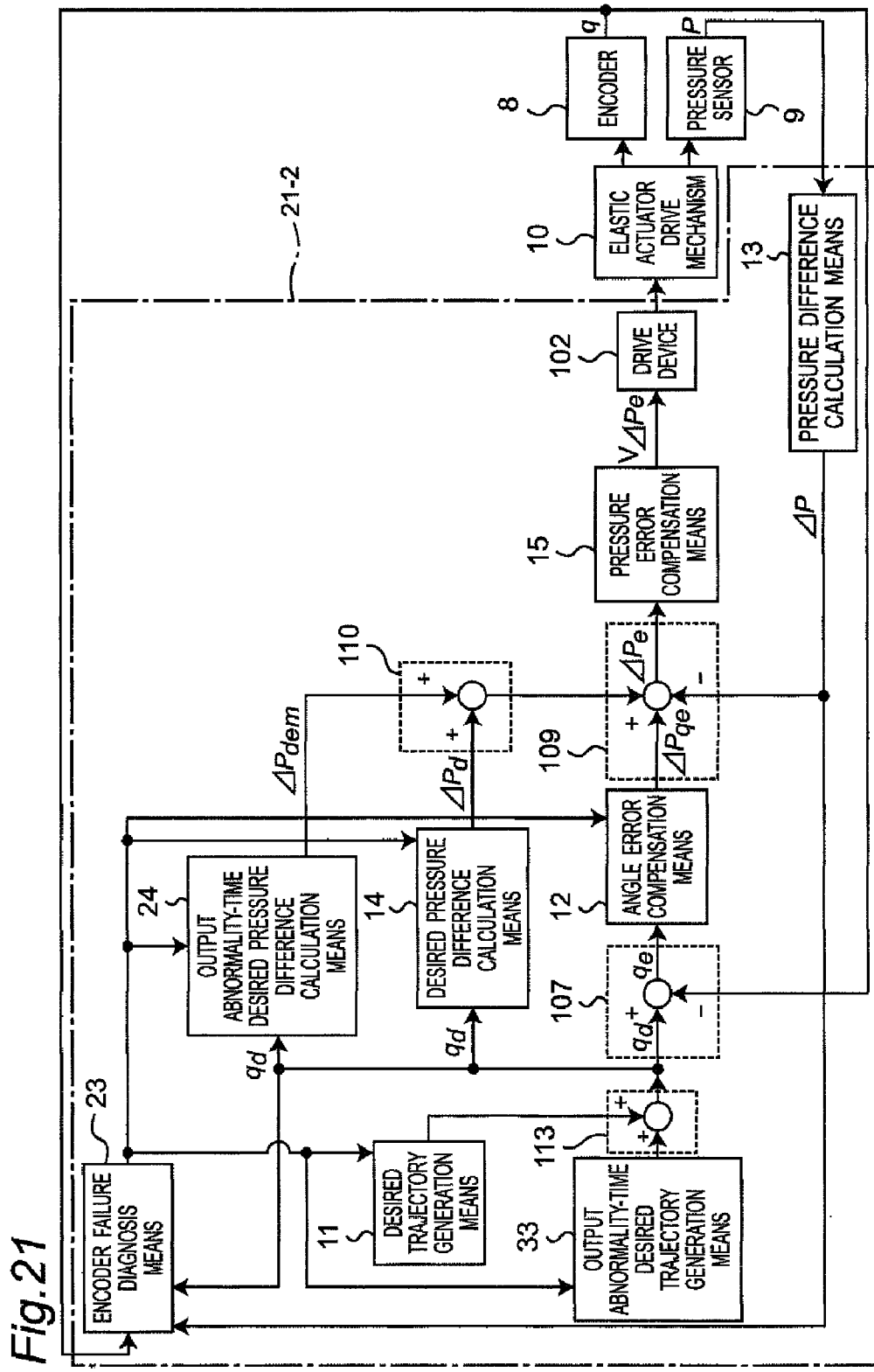
FIG. 21 is a control block diagram of an elastic actuator control apparatus and the like in a third embodiment of the present invention.

FIG. 21 is a view showing a specific configuration of a control apparatus 21-2 of an elastic actuator drive mechanism 10 according to a third embodiment of the present invention. The control apparatus 21-2 is provided, for example, in the control computer 19, and includes: a desired trajectory generation means (unit) 11; a desired pressure difference calculation means (unit) 14; an angle error compensation means (unit) 12; a pressure difference calculation means (unit) 13; a pressure difference error compensation means (unit) 15; an output error calculation part 107; an internal state error calculation part 109; an encoder failure diagnosis means (unit) 23; an output abnormal-time desired pressure difference calculation means (unit) 24; a desired internal state addition means (unit) 110; a drive device 102; an output abnormality-time desired trajectory generation means (unit) 33; and a desired trajectory addition means (unit) 113.

The encoder failure diagnosis means (unit) (encoder abnormality diagnosis means (unit)) 23 as an example of the abnormality diagnosis means (unit) 104 diagnoses whether or not the output (joint angle vector) of each encoder 8 is normal based on the output (joint angle vector) q of the encoder 8, the output (desired joint angle vector) $q_d$ of the desired trajectory addition means 113, and the output (pressure difference) $\Delta P$ from the pressure difference calculation means 13. As a result of the diagnosis, in the case where the encoder failure diagnosis means 23 determines that the output of the encoder 8 is not normal, that is, abnormal, an abnormality notification signal is outputted from the encoder failure diagnosis means 23 to the angle error compensation means 12, the desired pressure difference calculation means 14, the output abnormality-time desired pressure difference calculation means 24, the desired trajectory generation means 11, and the output abnormality-time desired trajectory generation means 33. On the other hand, as a result of the diagnosis, in the case where the encoder failure diagnosis means 23 determines that the output of the encoder 8 is normal, the abnormality notification signal is not outputted from the encoder failure diagnosis means 23 to the angle error compensation means 12, the desired pressure difference calculation means 14, the output abnormality-time desired pressure difference calculation means 24, the desired trajectory generation means 11, and the output abnormality-time desired trajectory generation means 33. Note that, immediately after activation of the program (first operation), the abnormality diagnosis means 104 does not operate.

The desired trajectory generation means 11 receives the abnormality notification signal from the encoder failure diagnosis means 23. When there is no input of the abnormality notification signal from the encoder failure diagnosis means 23, the desired joint angle vector $q_d$ for realizing the operation of the elastic actuator drive mechanism 10, which is taken as a desired, is outputted from the desired trajectory generation means 11 to the desired trajectory addition means 113. A generation method for the desired joint angle vector $q_d$ is similar to that of the first embodiment. When there is an input of the abnormality notification signal from the encoder failure diagnosis means 23, the desired joint angle vector $q_d$ is not outputted ($q_d$ is set equal to zero (qd=0)). Note that, immediately after the activation of the program, the desired trajectory generation means 11 outputs the desired joint angle vector $q_d$ to the desired trajectory addition means 113.

The output abnormality-time desired trajectory generation means 33 receives the abnormality notification signal from the encoder failure diagnosis means 23. When there is no input of the abnormality notification signal from the encoder failure diagnosis means 23, the desired joint angle vector $q_d$ for realizing the operation of the elastic actuator drive mechanism 10, which is taken as the desired, is not outputted ($q_d$ is set equal to zero ($q_d$=0)). A generation method for the desired joint angle vector $q_d$ is similar to that of the desired trajectory generation means 11. However, the desired angle vectors $q_{dt}=[q_{dt1}, q_{dt2}]^T(q_{dt0}, q_{dt1}, q_{dt2}, \ldots)$ for each point at each time (t=0, t=$t_1$, t=$t_2$, . . . ), which are recorded in advance, are different from those of the desired trajectory generation means 11. When there is an input of the abnormality notification signal from the encoder failure diagnosis means 23, the desired joint angle vector $q_d$ is outputted to the desired trajectory addition means 113. Note that, immediately after the activation of the program, the output abnormality-time desired trajectory generation means 33 does not output the desired joint angle vector $q_d$ to the desired trajectory addition means 113.

The desired trajectory addition means 113 adds the desired joint angle vector as the output from the desired trajectory generation means 11 and the desired joint angle vector as the output from the output abnormality-time desired trajectory generation means 33 to each other to calculate the desired joint angle vector, and outputs the calculated desired joint angle vector to the desired pressure difference calculation means 14, the output abnormality-time desired pressure difference calculation means 24, and the output error calculation part 107.

Other configurations are similar to those of the control apparatus 21-1 of the first embodiment, which is shown in FIG. 6, and a description thereof is omitted.

Figure 22:
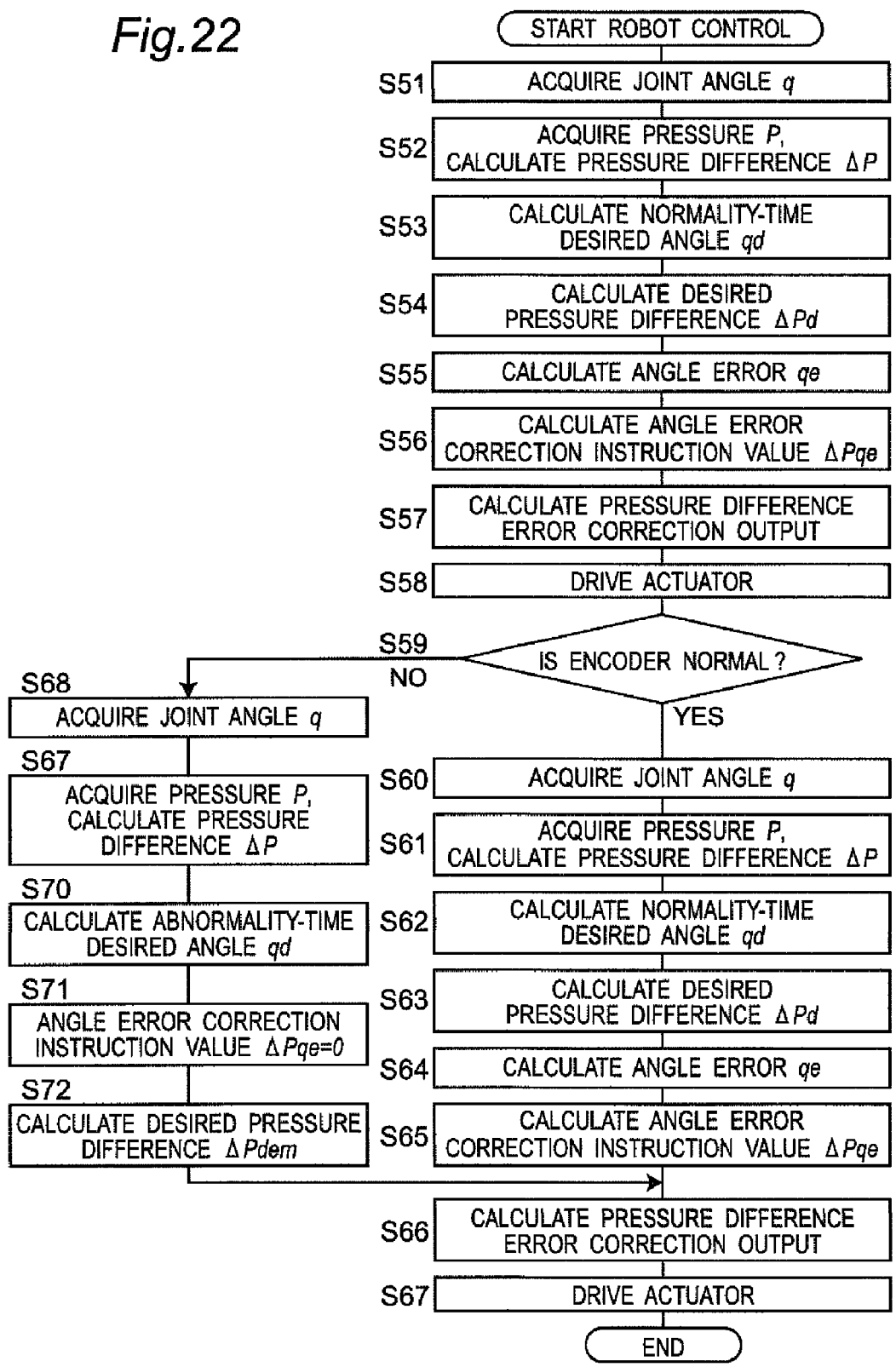
FIG. 22 is a flowchart of operation steps of a control program for the control apparatus of the elastic actuator drive mechanism in the third embodiment of the present invention.

Actual operation steps of the control program based on the above-described principle are described based on a flowchart of FIG. 22.

In step S51, the joint angle q measured by the encoder 8 is taken into the control apparatus 21-2.

Subsequently, in step S52, the internal pressure values P of the respective actuators 100, which are measured by the pressure sensor 9, are taken into the control apparatus 21-2, and the present pressure difference ΔP between the internal pressures of two actuators 100 and 100 driven to be antagonistic to each other is calculated by the pressure difference calculation means 13.

Subsequently, in step S53, the following operations are performed. Since this is the first operation, the abnormality notification signal is not inputted to the desired pressure difference calculation means 14, and accordingly, based on the operation program for the elastic actuator drive mechanism 10, which is previously stored in the desired trajectory generation means 11, the desired trajectory generation means 11 calculates the desired joint angle vector $q_d$ of the elastic actuator drive mechanism 10. Similarly, since this is the first operation, the abnormality notification signal is not inputted to the output abnormality-time desired trajectory generation means 33, and accordingly, the output abnormality-time desired trajectory generation means 33 outputs the desired joint angle vector $q_d$ (=0). The desired trajectory addition means 113 adds the desired joint angle vector $q_d$ as the output of the desired trajectory generation means 11 and the desired joint angle vector $q_d$ (=0) as the output of the output abnormality-time desired trajectory generation means 33 to each other, takes a value obtained by the addition as a desired joint angle vector, and outputs the desired joint angle vector to the desired pressure difference calculation means 14, the output abnormality-time desired pressure calculation means 24, and the output error calculation part 107.

Subsequently, in step S54, since this is the first operation, the abnormality notification signal is not inputted to the desired pressure difference calculation means 14, the desired pressure difference $\Delta P_d$ is calculated by the desired pressure difference calculation means 14 based on the desired joint angle vector $q_d$ from the desired trajectory addition means 113.

Subsequently, in step S55, the angle error vector $q_e$ as a difference between the desired joint angle vector $q_d$ from the desired trajectory addition means 113 and the present joint angle q from the encoder 8 is calculated by the output error calculation part 107.

Subsequently, in step S56, based on the angle error vector $q_e$ from the output error calculation part 107, the angle error correction instruction value $\Delta P_{qe}$ is calculated by the angle error compensation means 12. As the angle error compensation means 12, for example, a 210 compensator may be considered.

Subsequently, in step S56, since this is the first operation, the abnormality notification signal is not inputted to the desired pressure difference calculation means 14, the output abnormality-time desired pressure difference calculation means 24, the desired trajectory generation means 11, and the output abnormality-time desired trajectory generation means 33, and accordingly, the desired pressure difference $\Delta P_d$ as the output from the desired pressure difference calculation means 14 and the desired pressure difference $\Delta P_{dem}$ (=0) as the output from the output abnormality-time desired pressure difference calculation means 24 are added to each other by the desired internal state addition means 110, and thus, the desired pressure difference $\Delta P_d$ is calculated, and is outputted to the internal state error calculation part 109.

Subsequently, in step S57, in the internal state error calculation part 109, the pressure difference error (pressure error value) $\Delta P_e$ is calculated thereby based on the angle error correction instruction value $\Delta P_{qe}$ calculated by the angle error compensation means 12, the desired pressure difference $\Delta P_d$ from the desired internal state addition means 110, and the pressure difference ΔP from the pressure difference calculation means 13. Then, based on the pressure difference error (pressure error value) $\Delta P_e$ calculated by the internal state error calculation part 109, the pressure difference error correction output $V_{\Delta pe}$ is calculated in the pressure difference error compensation means 15.

Subsequently, in step S58, the pressure difference error correction output $V_{\Delta pe}$ is given as the voltage instruction value from the pressure difference error compensation means 15 through the input/output IF 20 such as the D/A board to the respective flow rate control electromagnetic valves 18, and the respective flow rate control electromagnetic valves 18 change the pressures in the actuators 100 corresponding thereto. In this manner, the rotation motions of the respective joints 6 of the elastic actuator drive mechanism 10 are generated.

By the first operation in step S51 to step S58, which are described above, the control for the first operation of the elastic actuator drive mechanism 10 is realized.

Subsequently, in step S59, based on the output (desired joint angle vector) $q_d$ of the desired trajectory generation means 11, the output (joint angle vector) q of the encoder 8, and the output ΔP from the pressure difference calculation means 13, whether or not each encoder 8 is normal is determined by the encoder failure diagnosis means 23. In the case where it is determined by the encoder failure diagnosis means 23 that the encoder 8 is not normal, the abnormality notification signal is outputted from the encoder failure diagnosis means 23 the angle error compensation means 12, the desired pressure difference calculation means 14, the output abnormality-time desired pressure difference calculation means 24, the desired trajectory generation means 11, and the output abnormality-time desired trajectory generation means 33.

A description is made below of the case where it is determined by the encoder failure diagnosis means 23 that the encoder 8 is normal in step S59.

Subsequently, in step S60, the joint angle q measured by the encoder 8 is taken into the control apparatus 21-2.

Subsequently, in step S61, the internal pressure values P of the respective actuators 100, which are measured by the pressure sensor 9, are taken into the control apparatus 21-2, and the present pressure difference ΔP between the internal pressures of two actuators 100 and 100 driven to be antagonistic to each other is calculated by the pressure difference calculation means 13.

Subsequently, in step S62, since the encoder 8 is normal, the abnormality notification signal is not inputted to the desired trajectory generation means 11 and the output abnormality-time desired trajectory generation means 33, and accordingly, based on the operation program for the elastic actuator drive mechanism 10, which is previously stored in the desired trajectory generation means 11, the desired trajectory generation means 11 calculates the desired joint angle vector $q_d$ of the elastic actuator drive mechanism 10. Moreover, the output abnormality-time desired trajectory generation means 33 outputs the desired joint angle vector $q_d$=0. Furthermore, the desired joint angle vector is added to the desired joint angle vector $q_d$ by the desired trajectory addition means 113, and the desired joint angle vector $q_d$ thus subjected to the addition is outputted.

Subsequently, in step S63, since the encoder 8 is normal, the abnormality notification signal is not inputted to the desired pressure difference calculation means 14, and accordingly, the desired pressure difference $\Delta P_d$ is calculated based on the desired, joint angle vector $q_d$ from the desired trajectory addition means 113 by the desired pressure difference calculation means 14.

Subsequently, in step S64, the angle error vector $q_e$ as the difference between the desired joint angle vector $q_d$ from the desired trajectory addition means 113 and the present joint angle q from the encoder 8 is calculated by the output error calculation part 107.

Subsequently, in step S65, the angle error correction instruction value $\Delta P_{qe}$ is calculated by the angle error compensation means 12 based on the angle error vector $q_e$ from the output error calculation part 107. As the angle error compensation means 12, for example, a 210 compensator may be considered.

Subsequently, in step S66, in the internal state error calculation part 109, the pressure difference error (pressure error value) $\Delta P_e$ is calculated thereby based on calculated by the angle error compensation means 12, the desired pressure difference $\Delta P_d$ from the desired internal state addition means 110, and the pressure difference $\Delta P$ from the pressure difference calculation means 13. Then, based on the pressure difference error (pressure error value) $\Delta P_e$ calculated by the internal state error calculation part 109, the pressure difference error correction output $V_{\Delta pe}$ is calculated in the pressure difference error compensation means 15.

Subsequently, in step S67, the pressure difference error correction output $V_{\Delta pe}$ is given as the voltage instruction value from the pressure difference error compensation means 15 through the input/output IF 20 such as the D/A board to the respective flow rate control electromagnetic valves 18, and the respective flow rate control electromagnetic valves 18 change the pressures in the actuators 100 corresponding thereto. In this manner, the rotation motions of the respective joints 6 of the elastic actuator drive mechanism 10 are generated.

Step S59 to step S67 described above are repeatedly executed as a calculation loop of the control, whereby the control for the operation of the elastic actuator drive mechanism 10 in the case where each of the encoders 8 operates normally is realized.

A description is made below of the case where it is determined by the encoder failure diagnosis means 23 that each of the encoders 8 is not normal in step S59.

Subsequently to step S59, in step S68, the joint angle q measured by the encoder 8 is taken into the control apparatus 21-2.

Subsequently, in step S67, the internal pressure values P of the respective actuators 100, which are measured by the pressure sensor 9, are taken into the control apparatus 21-2, and the present pressure difference $\Delta P$ between the internal pressures of two actuators 100 and 100 driven to be antagonistic to each other is calculated by the pressure difference calculation means 13.

Subsequently, in step S70, since the encoder 8 is not normal, the abnormality notification signal is inputted to the desired trajectory generation means 11 and the output abnormality-time desired trajectory generation means 33, and accordingly, based on the operation program for the elastic actuator drive mechanism 10, which is previously stored in the output abnormality-time desired trajectory generation means 33, the output abnormality-time desired trajectory generation means 33 calculates the desired joint angle vector $q_d$ of the elastic actuator drive mechanism 10. Moreover, the desired trajectory generation means 11 outputs the desired joint angle vector $q_d$=0. Furthermore, to the above-described desired joint angle vector $q_d$=0, the desired joint angle vector is added by the desired trajectory addition means 113, and the desired joint angle vector $q_d$ thus subjected to the addition is outputted.

Subsequently, in step S71, based on the abnormality notification signal inputted from the encoder failure diagnosis means 23 to the angle error compensation means 12, $\Delta P_{qe}$=0 is outputted from the angle error compensation means 12.

Subsequently, in step S72, based on the abnormality notification signal inputted from the encoder failure diagnosis means 23 to the output desired pressure difference calculation means 24, the desired pressure difference $\Delta P_{dem}$ as the abnormality-time desired value is calculated based on the desired joint angle vector $q_d$ from the desired trajectory addition means 113, by the output desired pressure difference calculation means 24 that also functions as an example of the abnormality-time desired value generation means (unit).

Subsequently, in step S66, since the encoder 8 is not normal, the abnormality notification signal is inputted to the desired pressure difference calculation means 14, and the output abnormality-time desired pressure difference calculation means 24, and accordingly, the desired pressure difference $\Delta P_d$=0 as the output from the desired pressure difference calculation means 14 and the desired pressure difference $\Delta P_{dem}$ as the output from the output abnormality-time desired pressure difference calculation means 24 are added to each other by the desired internal state addition means 110. Then, the desired pressure difference $\Delta P_d$ is thereby calculated, and is outputted to the internal state error calculation part 109. In the internal state error calculation part 109, the pressure difference error (pressure error value) $\Delta P_e$ is calculated thereby based on the angle error correction instruction value $\Delta P_{qe}$=0 calculated by the angle error compensation means 12, on the desired pressure difference $\Delta P_d$ from the desired internal state addition means 110, and on the pressure difference $\Delta P$ from the pressure difference calculation means 13. Then, based on the pressure difference error (pressure error value) $\Delta P_e$ calculated by the internal state error calculation part 109, the pressure difference error correction output $V_{\Delta pe}$ is calculated in the pressure difference error compensation means 15.

Subsequently, in step S67, the pressure difference error correction output $V_{\Delta pe}$ is given as the voltage instruction value from the pressure difference error compensation means 15 through the input/output IF 20 such as the D/A board to the respective flow rate control electromagnetic valves 18, and the respective flow rate control electromagnetic valves 18 change the pressures in the actuators 100 corresponding thereto. In this manner, the rotation motions of the respective joints 6 of the elastic actuator drive mechanism 10 are generated.

Step S59, step S68 to step S72, step S66, and step S67 described above are repeatedly executed as a calculation loop of the control, whereby the control for the operation of the elastic actuator drive mechanism 10 in the case where each of the encoders 8 does not operate normally is realized.

The output abnormality-time desired trajectory generation means 33 is provided, whereby such effects as below can be exerted.

For example, in a program for the elastic actuator drive mechanism 10, in which, when the encoder 8 is normal, assembly work to grasp an object at a point A and to then fit the object into another object at a point B is performed, the desired angle vector $q_{dt}$ stored in advance in the desired trajectory generation means 11 performs such an operation to start the movement from the point A, move to the point B, perform a fitting operation for the object at the point B, and return to the point A. However, in the case where the encoder 8 is abnormal, it becomes difficult to realize such a minute operation as the fitting work, and accordingly, in some cases, the fitting work for the object is not performed at the point B, but more desirably, the desired angle vector $q_{dt}$ is returned to the point A, and the grasped object is put on an original position thereof. In such a case, the desired angle vector stored in advance in the output abnormality-time desired trajectory generation means 33 is set so as to realize such an operation to return to the point A, to release the grasp for the object, and to put the object to the original position, whereby a desired operation can be realized.

As described above, in accordance with the control apparatus 21-2 of the third embodiment, the pressure sensor 9, the desired pressure difference calculation means 14, and the pressure difference error compensation means 15 are arranged, whereby the internal pressure control system to perform feedback for the internal state of the elastic actuator 100 is configured, and the encoder failure diagnosis means 23 is further arranged, whereby it is diagnosed whether or not the encoder 8 is normal. Hence, when it is diagnosed by the encoder failure diagnosis means 23 that the encoder 8 is not normal, the output of the angle error compensation means 12 is stopped. Moreover, the output abnormality-time desired pressure difference calculation means 24 is arranged, and when the encoder 8 is abnormal, a control system that drives the drive device 102 based on the desired pressure difference calculation means 24 and the pressure difference error compensation means 15 is configured by the control apparatus 21-2. With such a configuration, it becomes possible to safely control the elastic actuator drive mechanism 10, which is capable of continuously operating the elastic actuator 100 without instantaneously stopping the operation thereof even in the case where each encoder 8 has failed, without preparing the instructed data in advance or providing the sensor capable of computing the alternative signal.

Moreover, in the third embodiment, the output abnormality-time desired trajectory generation means 33 is arranged, and a configuration is adopted so as to generate, when the encoder is abnormal, a desired trajectory different from that when the encoder is normal. With such a configuration, there can be performed the operation control at the time of encoder failure, which cannot be realized in the second embodiment, and which can operate the drive mechanism 10 of the elastic actuator to the desired position corresponding to the failure of the encoder when the encoder has failed.

Fourth Embodiment

Figure 17:
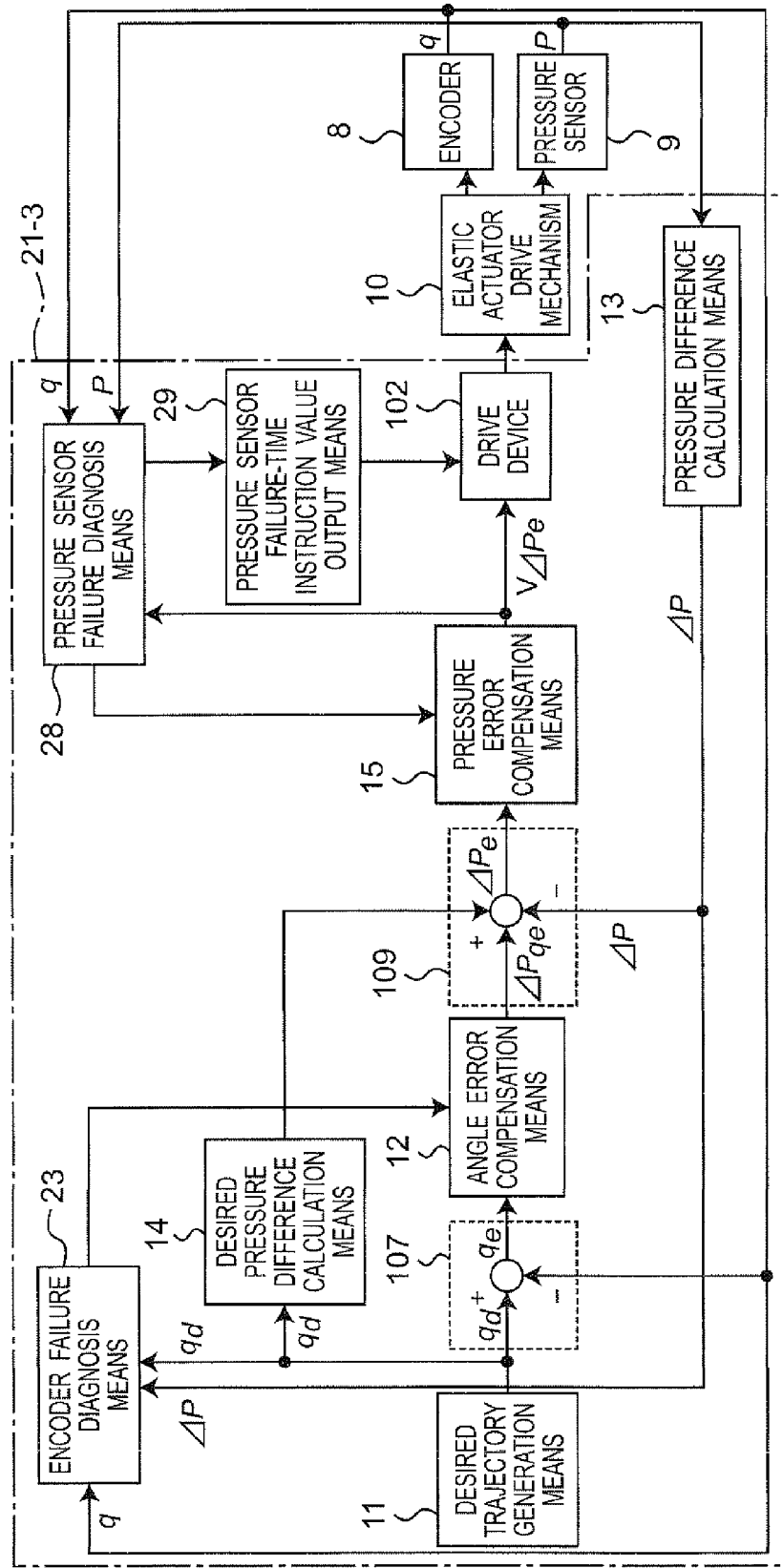
FIG. 17 is a control block diagram of a control apparatus and the like of an elastic actuator drive mechanism in a fourth embodiment of the present invention.

FIG. 17 is a view showing a specific configuration of a control apparatus 21-3 of an elastic actuator drive mechanism 10 according to a fourth embodiment of the present invention. The control apparatus 21-3 is provided, for example, in the control computer 19, and includes: a desired trajectory generation means (unit) 11; a desired pressure difference calculation means (unit) 14; an angle error compensation means (unit) 12; a pressure difference calculation means (unit) 13; a pressure difference error compensation means (unit) 15; an output error calculation part 107; an internal state error calculation part 109; an encoder failure diagnosis means (unit) 23; a pressure sensor failure diagnosis means (unit) 28; a pressure sensor failure-time instruction value output means (unit) 29; and a drive device 102.

The pressure sensor failure diagnosis means 28 as an example of an internal state measurement means abnormality determination means (unit) diagnoses whether or not the output of the pressure sensor 9 is normal based on the output P of the pressure sensor 9, the output p of the encoder 8, and the output $V_{\Delta pe}$ of the pressure difference error compensation means 15. In the case where it is determined by the pressure sensor failure diagnosis means 28 that the output of the pressure sensor 9 is abnormal, a pressure sensor failure signal (pressure sensor abnormality signal) is outputted from the pressure sensor failure diagnosis means 28 to the pressure difference error compensation means 15 and the pressure sensor failure-time instruction output means (unit) (pressure sensor abnormality-time instruction output means (unit)) 29. As an example for determining whether or not the output of the pressure sensor 9 is normal, such a method as follows is used. For example, in the case where the output P of the pressure sensor 9 exceeds a designed pressure of the joint shaft 6 by a fixed value or more, then the pressure sensor failure diagnosis means 28 determines that the pressure sensor 9 is abnormal. Moreover, for example, in the case where a designed pressure range of the joint shaft 6 is 0 to 600 kPa, when an absolute value of the output P of the pressure sensor 9 takes a value exceeding 600 kPa, or on the contrary, takes a value less than 0 kPa, then the pressure sensor failure diagnosis means 28 determines that the pressure sensor 9 is abnormal (for example, has failed). Moreover, as another example of the abnormality, in the case where there are no variations in the output P of the pressure sensor 9 although the output (joint angle vector) q of the encoder 8 is varied so as to correspond to the fact that the output $V_{\Delta pe}$ of the pressure difference compensation means 15 is varied in order to detect the case where the pressure sensor 9 has failed and does not operate, the pressure sensor failure diagnosis means 28 determines that the encoder 8 is abnormal. With regard to the diagnosis that the encoder 8 is abnormal, the pressure sensor failure diagnosis means 28 determines that the encoder 8 is abnormal if at least one of the above-described conditions is satisfied.

The pressure sensor failure-time instruction value output means 29 as an example of an internal state abnormality-time instruction output means (unit) outputs an instruction value $V_{em}$ to the drive device 102 in the case of having received the pressure sensor failure signal from the pressure sensor failure diagnosis means 28. The instruction value $V_{em}$ is previously stored in a memory (not shown) of the pressure sensor failure-time instruction value output means 29.

When there is no input of the pressure sensor failure signal from the pressure sensor failure diagnosis means 28 to the pressure difference error compensation means 15, the pressure difference error $\Delta P_e$ is inputted from the internal state error calculation part 109 to the pressure difference error compensation means 15 as an example of the internal state error compensation means (unit) 111, and the pressure difference error correction output $V_{\Delta pe}$ is outputted from the pressure difference error compensation means 15 to the elastic actuator drive mechanism 10. The pressure difference error correction output $V_{\Delta pe}$ is given as the voltage instruction value through the input/output IF 20 such as the D/A board to the five-port flow rate control electromagnetic valves 18, and the respective joint shafts 6-1 and 6-2 are driven to rotate forward and reverse independently of each other, whereby the elastic actuator drive mechanism 10 operates.

In the pressure difference error compensation means 15, when there is an input of the pressure sensor failure signal from the pressure sensor failure diagnosis means 28, the pressure difference error correction output $V_{\Delta pe}$ is set at zero and outputted regardless of the value of the pressure difference error $\Delta P_e$ as the input from the internal state error calculation part 109. In this manner, the input to each five-port flow rate control electromagnetic valve 18 as the drive device 102 is limited only to the input from the pressure sensor failure-time instruction value output means 29.

A description is made below of an operation principle that the elastic actuator drive mechanism 10 is operable by the instruction value $V_{em}$, which is outputted by the pressure sensor failure-time instruction value output means 29, when it is determined by the pressure sensor failure diagnosis means 28 that the pressure sensor 9 is abnormal.

Figure 18:
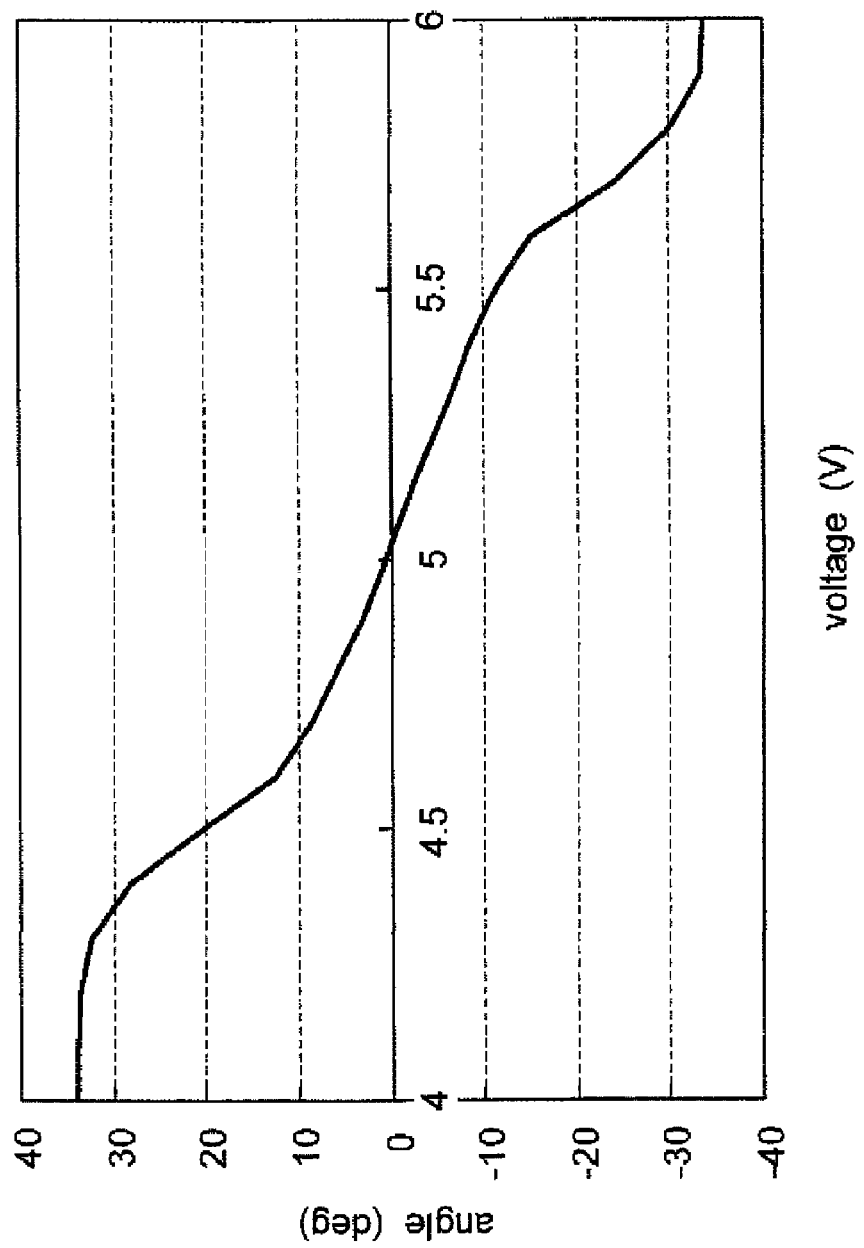
FIG. 18 is a graph showing an operation principle of a pressure sensor abnormality-time instruction output means in the fourth embodiment of the present invention.

FIG. 18 is a graph showing a relationship between the instruction value (voltage) given to the five-port flow rate control electromagnetic valve 18 and the joint angle of the joint shaft 6 in the elastic actuator drive mechanism 10 shown in FIG. 1. The relationship between the instruction value and the joint angle does not always completely coincide with the relationship shown in FIG. 18 since such a relationship is affected by the load applied to the drive member 313, or by a chronological change of the elastic expansion/contraction structures 1, or by a disturbance related to the drive member 313 etc.; however, a state where both of the relationships described above are approximate to each other is maintained. Therefore, although such accuracy as realized at the time of being controlled by using the angle error compensation means 12 and the pressure difference error compensation means 15 cannot be realized, it is possible to move the elastic actuator drive mechanism 10 to an approximate position.

Figure 19:
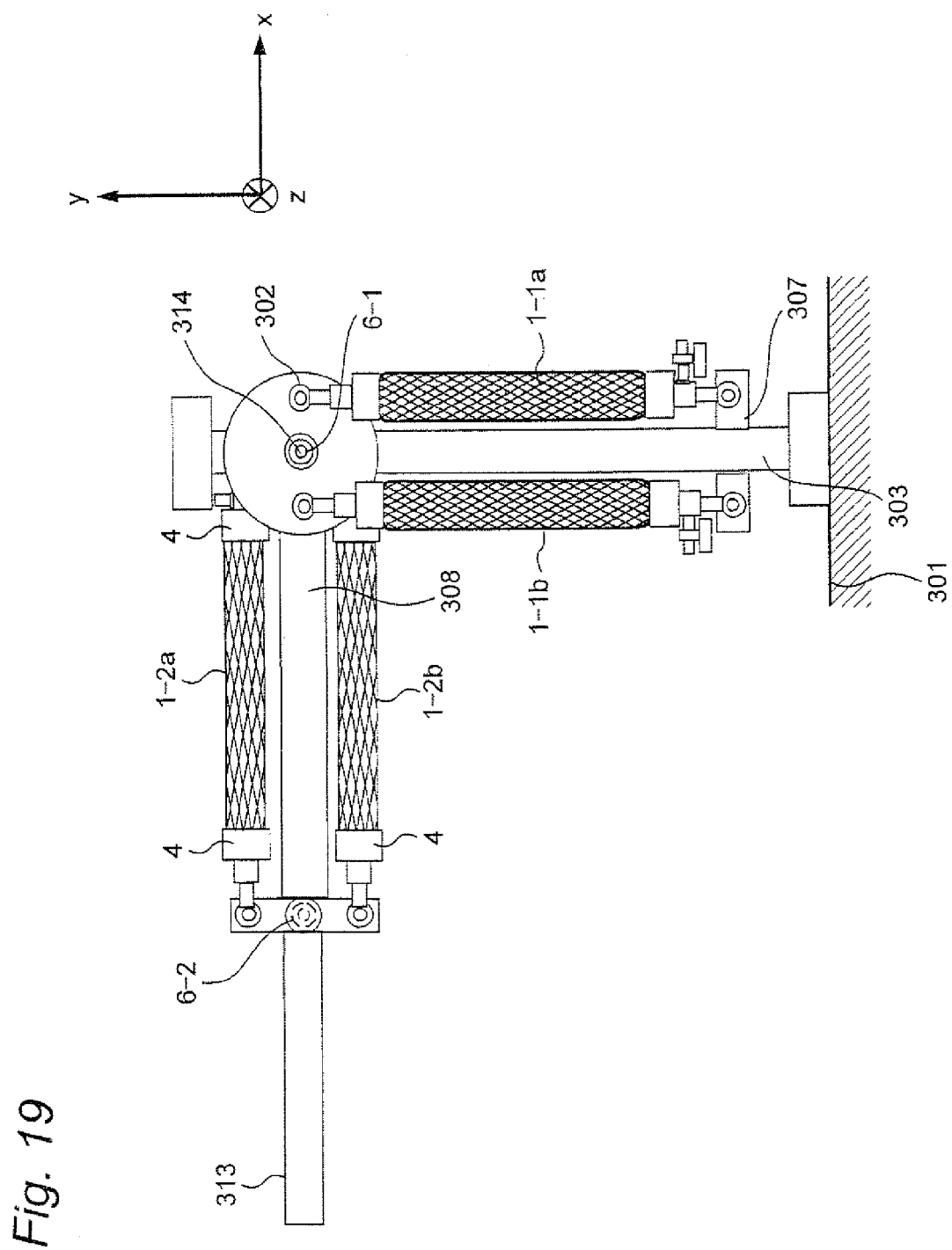
FIG. 19 is a view showing an initial position of the elastic actuator drive mechanism in the fourth embodiment of the present invention.

Moreover, as the instruction value $V_{em}$ previously stored in the memory (not shown) of the pressure sensor failure-time instruction value output means 29, such a value to move the elastic actuator drive mechanism 10 to an initial position thereof may be considered. For example, in the case where a position where the elastic expansion/contraction structures 1-1a and 1-1b become neutral (that is, a position in a state where either of the elastic expansion/contraction structures 1-1a and 1-1b does not extend or contract) is the initial position of the drive member 313, the elastic actuator drive mechanism 10 starts to move from the initial position shown in FIG. 19 (for example, a state where the longitudinal direction of the drive member 313 and the longitudinal direction of the support member 308 are located substantially colinearly). Then, in the case where it is diagnosed by the pressure sensor failure diagnosis means 28 that the pressure sensor 9 is abnormal when the drive member 313 is located at a certain angle with respect to the longitudinal direction of the support member 308, it is generally rare that the operation of the elastic actuator drive mechanism 10 is started from an unstable position or a dangerous position, and accordingly, it is highly possible that it may be safer that the drive of the elastic actuator drive mechanism 10 is stopped at the predetermined initial position than being stopped at a position where a peripheral situation is unknown. Moreover, since the drive member 313 has already passed through a route from the initial position to the present angle, it is considered that the drive member 313 is capable of passing through a reverse route from the present angle to the initial position.

Moreover, since the instruction value $V_{em}$ is set in advance, it is possible to arbitrarily set a position of the elastic actuator 100 at a position that is other than the initial position and at an angle of which safety is already known to a person, and to store the instruction value $V_{em}$ in the memory not shown) of the pressure sensor failure-time instruction value output means 29.

As described above, in the fourth embodiment, the pressure sensor failure diagnosis means 28 and the pressure sensor failure-time instruction value output means 29 are arranged, whereby it becomes possible to safely control the elastic actuator drive mechanism 10 so as not to instantaneously stop the operation of the elastic actuator 100 even in the case where the pressure sensor 9 has failed, but to stop the operation after the elastic actuator 100 moves to the safe position such as the initial position.

Moreover, in each of the first to fourth embodiments, the joint angle is used as the output; however, the present invention is not limited thereto, and also covers such a case where a displacement speed sensor as an example of a displacement speed measurement means (unit) is used as the output measurement means 103, and displacement speed control is performed by using the displacement speed as an output value.

In each of the first to fourth embodiments, the sensor is provided as an example of the internal state measurement means (unit) 112; however, a similar effect is exerted even in the case where an observer is provided, the internal state is estimated by the observer, and an estimated value of the internal state is used.

Moreover, in each of the first to fourth embodiments, the description thereof has been made by taking, as an example of the elastic actuator 100, the pneumatically-driven actuator driven by the fluid pressure; however, the present invention is not limited thereto. Even in the case of using, as another example of the elastic actuator, a hydraulic actuator or an actuator that drives an elastic body such as a conductive polymer, a dielectric polymer, and a variety of gels by electric stimulation, similar effects to those in the case of the pneumatically-driven actuator can be exhibited by employing an electric field, a charge quantity or the like as another example of the internal state.

Note that arbitrary embodiments or modification examples among the above-described variety of embodiments or modification examples thereof are combined as appropriate, whereby the effects individually inherent therein can be exerted.

The control apparatus, the control method, and the control program for the elastic actuator drive mechanism according to the present invention are useful as a control apparatus, a control method, and a control program, which serve for performing the position control such as the trajectory control for the hand position of the robot arm that is operated by the elastic actuator. Moreover, the present invention is not limited to the robot arm, but is also applicable to the control apparatus, the control method, and the control program for a rotation mechanism by the elastic actuator in a production facility or the like, or to a control apparatus, a control method, and a control program for a linear motion mechanism by the elastic actuator, such as a linear slider and a press machine.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A control apparatus for an elastic actuator drive mechanism, comprising;
    a desired value output unit that outputs a desired value of an output of an elastic actuator;
    an output error compensation unit that compensates an output error by receiving the desired value of the output of the elastic actuator and a measurement value of the output of the elastic actuator, the measurement value being measured by an output measurement unit;
    a desired internal state decision unit that decides a desired value of the internal state of the elastic actuator with respect to a measurement value of the internal state, based on a relationship between the output and the internal state of the elastic actuator, with reference to the desired value of the output of the elastic actuator, the measurement value being measured by an internal state measurement unit;

an internal state error compensation unit that compensates an internal state error based on an output from the output error compensation unit and an output from the internal state measurement unit; and an abnormality determination unit that determines whether or not the output measurement unit is abnormal based on the measurement value of the output of the elastic actuator measured by the output measurement unit, the measurement value of the internal state of the elastic actuator measured by the internal state measurement unit, and the desired value of the output of the elastic actuator, wherein when the abnormality determination unit determines that the output measurement unit is abnormal, an operation of the output error compensation unit is stopped, and control is performed so that the elastic actuator continues to operate based on an output desired value as the output of the desired value output unit by the desired internal state decision unit and the internal state error compensation unit.

2. The control apparatus for an elastic actuator drive mechanism according to claim 1, wherein when whether or not the output measurement unit is abnormal is determined by the abnormality determination unit, the output measurement unit is determined as abnormal in a case where the measurement value of the output of the elastic actuator is out of a predetermined range or in a case where a correspondence relationship between the measurement value of the output of the elastic actuator and the measurement value of the internal state of the elastic actuator measured by the internal state measurement unit, is out of predetermined relational information, and in other cases, the output measurement unit is determined as not abnormal.

3. The control apparatus for an elastic actuator drive mechanism according to claim 1, wherein the desired internal state decision unit comprises:

a normality-time desired internal state decision unit; and an abnormality-time desired internal state decision unit, and when the abnormality determination unit determines that the output measurement unit is not abnormal, operation control for the elastic actuator drive mechanism is performed by using an output of the normality-time desired internal state decision unit, whereas when the abnormality determination unit determines that the output measurement unit is abnormal, the operation control for the elastic actuator drive mechanism is performed by using an output of the abnormality-time desired internal state decision unit.

4. The control apparatus for an elastic actuator drive mechanism according to claim 2, wherein the desired internal state decision unit comprises:

a normality-time desired internal state decision unit; and an abnormality-time desired internal state decision unit, and when the abnormality determination unit determines that the output measurement unit is not abnormal, operation control for the elastic actuator drive mechanism is performed by using an output of the normality-time desired internal state decision unit, whereas when the abnormality determination unit determines that the output measurement unit is abnormal, the operation control for the elastic actuator drive mechanism is performed by using an output of the abnormality-time desired internal state decision unit.

5. The control apparatus for an elastic actuator drive mechanism according to claim 3, wherein the abnormality-time desired internal state decision unit decides a desired internal state based on a static model of the elastic actuator drive mechanism.

6. The control apparatus for an elastic actuator drive mechanism according to claim 4, wherein the abnormality-time desired internal state decision unit decides a desired internal state based on a static model of the elastic actuator drive mechanism.

7. The control apparatus for an elastic actuator drive mechanism according to claim 1, further comprising:

an abnormality-time desired value generation unit that generates and outputs an abnormality-time desired value when the abnormality determination unit determines that the output measurement unit is abnormal.

8. The control apparatus for an elastic actuator drive mechanism according to claim 2, further comprising:

an abnormality-time desired value generation unit that generates and outputs an abnormality-time desired value when the abnormality determination unit determines that the output measurement unit is abnormal.

9. The control apparatus for an elastic actuator drive mechanism according to claim 3, further comprising:

an abnormality-time desired value generation unit that generates and outputs an abnormality-time desired value when the abnormality determination unit determines that the output measurement unit is abnormal.

10. The control apparatus for an elastic actuator drive mechanism according to claim 4, further comprising:

an abnormality-time desired value generation unit that generates and outputs an abnormality-time desired value when the abnormality determination unit determines that the output measurement unit is abnormal.

11. The control apparatus for an elastic actuator drive mechanism according to claim 1, further comprising:

an internal state measurement unit abnormality determination unit that determines whether or not the internal state measurement unit is abnormal; and an internal state abnormality-time instruction output unit that performs an output instruction to a drive device of the elastic actuator drive mechanism when the internal state measurement unit is abnormal, wherein when the internal state measurement unit abnormality determination unit determines that the internal state measurement unit is abnormal, the operation control for the elastic actuator drive mechanism is performed based on the output instruction of the internal state abnormality-time instruction output unit.

12. The control apparatus for an elastic actuator drive mechanism according to claim 2, further comprising:

an internal state measurement unit abnormality determination unit that determines whether or not the internal state measurement unit is abnormal; and an internal state abnormality-time instruction output unit that performs an output instruction to a drive device of the elastic actuator drive mechanism when the internal state measurement unit is abnormal, wherein when the internal state measurement unit abnormality determination unit determines that the internal state measurement unit is abnormal, the operation control for the elastic actuator drive mechanism is performed based on the output instruction of the internal state abnormality-time instruction output unit.

13. The control apparatus for an elastic actuator drive mechanism according to claim 3, further comprising:

an internal state measurement unit abnormality-determination unit that determines whether or not the internal state measurement unit is abnormal; and an internal state abnormality-time instruction output unit that performs an output instruction to a drive device of the elastic actuator drive mechanism when the internal state measurement unit is abnormal, wherein when the internal state measurement unit abnormality determination unit determines that the internal state measurement unit is abnormal, the operation control for the elastic actuator drive mechanism is performed based on the output instruction of the internal state abnormality-time instruction output unit.

14. The control apparatus for an elastic actuator drive mechanism according to claim 4, further comprising:

an internal state measurement unit abnormality determination unit that determines whether or not the internal state measurement unit is abnormal; and an internal state abnormality-time instruction output unit that performs an output instruction to a drive device of the elastic actuator drive mechanism when the internal state measurement unit is abnormal, wherein when the internal state measurement unit abnormality determination unit determines that the internal state measurement unit is abnormal, the operation control for the elastic actuator drive mechanism is performed based on the output instruction of the internal state abnormality-time instruction output unit.

15. The control apparatus for an elastic actuator drive mechanism according to claim 1, wherein the elastic actuator is a fluid pressure actuator.

16. The control apparatus for an elastic actuator drive mechanism according to claim 2, wherein the elastic actuator is a fluid pressure actuator.

17. The control apparatus for an elastic actuator drive mechanism according to claim 3, wherein the elastic actuator is a fluid pressure actuator.

18. The control apparatus for an elastic actuator drive mechanism according to claim 4, wherein the elastic actuator is a fluid pressure actuator.

19. A control method for an elastic actuator drive mechanism, comprising:

outputting, by a desired value output unit, a desired value of an output of an elastic actuator;

compensating, by an output error compensation unit, an output error by receiving the desired value of the output of the elastic actuator and a measurement value of the output of the elastic actuator, the measurement value being measured by an output measurement unit;

deciding, by a desired internal state decision unit, a desired value of the internal state of the elastic actuator with respect to a measurement value of the internal state measured by an internal state measurement unit, based on a relationship between the output and the internal state of the elastic actuator, with reference to the desired value of the output of the elastic actuator;

compensating, by an internal state error compensation unit, an internal state error based on an output from the output error compensation unit and an output from the internal state measurement unit; and determining, by an abnormality determination unit, whether or not the output measurement unit is abnormal based on the measurement value of the output of the elastic actuator measured by the output measurement unit, the measurement value of the internal state of the elastic actuator measured by the internal state measurement unit, and the desired value of the output of the elastic actuator, wherein when the abnormality determination unit determines that the output measurement unit is abnormal, an operation of the output error compensation unit is stopped, and control is performed so that the elastic actuator continues to operate based on an output desired value as the output of the desired value output unit by the desired internal state decision unit and the internal state error compensation unit.

20. A control program for a control apparatus of an elastic actuator drive mechanism, the control program causing a computer to function as:

a desired value output unit that outputs a desired value of an output of an elastic actuator;

an output error compensation unit that compensates an output error by receiving the desired value of the output of the elastic actuator and a measurement value of the output of the elastic actuator, the measurement value being measured by an output measurement unit;

a desired internal state decision unit that decides a desired value of the internal state of the elastic actuator with respect to a measurement value of the internal state, based on a relationship between the output and the internal state of the elastic actuator, with reference to the desired value of the output of the elastic actuator, the measurement value being measured by an internal state measurement unit;

an internal state error compensation unit that compensates an internal state error based on an output from the output error compensation unit and an output from the internal state measurement unit; and an abnormality determination unit that determines whether or not the output measurement unit is abnormal based on the measurement value of the output of the elastic actuator measured by the output measurement unit, the measurement value of the internal state of the elastic actuator measured by the internal state measurement unit, and the desired value of the output of the elastic actuator, wherein when the abnormality determination unit determines that the output measurement unit is abnormal, an operation of the output error compensation unit is stopped, and control is performed so that the elastic actuator continues to operate based on an output desired value as the output of the desired value output unit by the desired internal state decision unit and the internal state error compensation unit.

* * * * *